United States Patent
Zlateff et al.

(10) Patent No.: US 7,529,255 B2
(45) Date of Patent: May 5, 2009

(54) PEER-TO-PEER MULTICASTING USING MULTIPLE TRANSPORT PROTOCOLS

(75) Inventors: Carmen Zlateff, Kirkland, WA (US); Cesare J. Saretto, Seattle, WA (US); John S. Holmes, Redmond, WA (US); John R. Selbie, Seattle, WA (US); Ravi T. Rao, Redmond, WA (US); David G. Thaler, Redmond, WA (US); Scott A. Senkeresty, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 11/111,532

(22) Filed: Apr. 21, 2005

(65) Prior Publication Data

US 2006/0239275 A1    Oct. 26, 2006

(51) Int. Cl.
*H04L 12/28* (2006.01)
(52) U.S. Cl. ................................ 370/401; 370/400
(58) Field of Classification Search .................. 370/400, 370/469, 464, 351
See application file for complete search history.

(56) References Cited

U.S. PATENT DOCUMENTS

| | | | |
|---|---|---|---|
| 5,278,955 A | 1/1994 | Forte et al. | |
| 5,987,515 A | 11/1999 | Ratcliff et al. | |
| 6,003,088 A | 12/1999 | Houston et al. | |
| 6,252,588 B1 | 6/2001 | Dawson | |
| 6,292,880 B1 | 9/2001 | Mattis et al. | |
| 6,434,568 B1 | 8/2002 | Bowman-Amuah | |
| 6,453,294 B1 | 9/2002 | Dutta et al. | |
| 6,463,078 B1 | 10/2002 | Engstrom et al. | |
| 6,490,615 B1 | 12/2002 | Dias et al. | |
| 6,535,867 B1 | 3/2003 | Waters | |
| 6,549,937 B1 | 4/2003 | Auerbach et al. | |
| 6,594,665 B1 | 7/2003 | Sowa et al. | |
| 6,610,104 B1 | 8/2003 | Lin et al. | |

(Continued)

FOREIGN PATENT DOCUMENTS

EP    0665670    8/1995

(Continued)

OTHER PUBLICATIONS

Borgen et al, IP over Sci, 2000, IEEE,73-77.*

(Continued)

*Primary Examiner*—Phuc H Tran
(74) *Attorney, Agent, or Firm*—Lee & Hayes, PLLC

(57) ABSTRACT

Communication functionality is described for conducting communication among a plurality of participants in peer-to-peer fashion. The communication functionality comprises peer-to-peer overlay functionality configured to establish a peer-to-peer overlay network that includes a plurality of participants. The peer-to-peer overlay functionality relies on endpoint provider functionality for physically exchanging information among the plurality of participants in the peer-to-peer overlay network. The endpoint provider functionality exchanges information using a transport mechanism. The transport mechanism accommodates multiple different transport protocols for exchanging information among the plurality of participants, allowing different pairs of participants to communicate with each other using different respective transport protocols. Address translation functionality is employed for translating address information between a first address space used by the peer-to-peer overlay functionality and a second address space used by the endpoint provider functionality.

19 Claims, 13 Drawing Sheets

U.S. PATENT DOCUMENTS

| | | | |
|---|---|---|---|
| 6,629,793 | B1 | 10/2003 | Miller |
| 6,813,690 | B1 | 11/2004 | Lango et al. |
| 7,013,327 | B1 | 3/2006 | Hickman et al. |
| 7,031,956 | B1 | 4/2006 | Lee et al. |
| 7,080,139 | B1 | 7/2006 | Briggs et al. |
| 7,127,613 | B2 | 10/2006 | Pabla et al. |
| 7,171,415 | B2 * | 1/2007 | Kan et al. .................. 707/10 |
| 7,203,356 | B2 | 4/2007 | Gokturk et al. |
| 7,302,270 | B1 | 11/2007 | Day |
| 7,353,253 | B1 | 4/2008 | Zhao |
| 7,437,364 | B1 | 10/2008 | Fredricksen et al. |
| 7,437,374 | B2 | 10/2008 | Chen et al. |
| 2001/0003189 | A1 | 6/2001 | Miyazawa et al. |
| 2001/0025280 | A1 | 9/2001 | Mandato et al. |
| 2002/0010746 | A1 | 1/2002 | Jilk et al. |
| 2002/0036990 | A1 | 3/2002 | Chodor et al. |
| 2002/0065931 | A1 | 5/2002 | Goodwin et al. |
| 2002/0077135 | A1 | 6/2002 | Hyon |
| 2002/0107925 | A1 | 8/2002 | Goldschneider et al. |
| 2002/0178230 | A1 | 11/2002 | Aggarwal et al. |
| 2002/0184309 | A1 | 12/2002 | Danker et al. |
| 2002/0184311 | A1 * | 12/2002 | Traversat et al. ............ 709/204 |
| 2002/0194006 | A1 | 12/2002 | Challapali |
| 2003/0065721 | A1 | 4/2003 | Roskind |
| 2003/0131098 | A1 | 7/2003 | Huntington et al. |
| 2003/0177184 | A1 | 9/2003 | Dickerman et al. |
| 2003/0177485 | A1 | 9/2003 | Waldin et al. |
| 2003/0208543 | A1 | 11/2003 | Enete et al. |
| 2003/0217099 | A1 | 11/2003 | Bobde et al. |
| 2003/0217142 | A1 | 11/2003 | Bobde et al. |
| 2003/0222907 | A1 | 12/2003 | Heikes et al. |
| 2003/0225846 | A1 | 12/2003 | Heikes et al. |
| 2003/0225848 | A1 | 12/2003 | Heikes et al. |
| 2004/0018858 | A1 | 1/2004 | Nelson |
| 2004/0070567 | A1 | 4/2004 | Longe et al. |
| 2004/0098502 | A1 | 5/2004 | Xu et al. |
| 2004/0153517 | A1 | 8/2004 | Gang et al. |
| 2004/0162877 | A1 | 8/2004 | Van Dok et al. |
| 2004/0268236 | A1 | 12/2004 | Chidlovskii et al. |
| 2005/0004993 | A1 | 1/2005 | Miller et al. |
| 2005/0027839 | A1 | 2/2005 | Day et al. |
| 2005/0273472 | A1 | 12/2005 | Reddy et al. |
| 2006/0015560 | A1 | 1/2006 | MacAuley et al. |

FOREIGN PATENT DOCUMENTS

| | | |
|---|---|---|
| WO | WO 01/71992 | 9/2001 |
| WO | WO 01/93503 | 12/2001 |
| WO | WO 2004/004139 | 1/2004 |
| WO | WO2005017660 | 2/2005 |

OTHER PUBLICATIONS

U.S. Appl. No. 10/611,575, Holmes, et al., filed Jul. 1, 2003.
U.S. Appl. No. 10/611,599, Miller, et al., filed Jul. 1, 2003.
U.S. Appl. No. 10/987,396, Zlateff, et al., filed Nov. 12, 2004.
Rosenberg, et al., "STUN-Simple Traversal of User Datagram Protocol (UDP) Through Network Address Translators (NATs)," Request for Comments: 3489, Network Working Group, available at <<http://www.ietf.org/rfc/rfc3489.txt>>, Mar. 2003, pp. 1-32.
Campbell et al. "Instant Message Sessions in Simple," Internet Draft, Simple Working Group, available at <<http://www.softarmor.com/wgdb/docs/draft-ietf-simple-message-sessions-01.txt>>, Jun. 30, 2003, pp. 1-57.
Handley, M, "GeRM: Generic RTP Multiplexing," Internet Engineering Task Force, Nov. 1998, available at <<http://www.cs.columbia.edu/~hgs/rtp/drafts/draft-ietf-avt-germ-00.txt>>, pp. 1-7.
"New Tunneling Techniques," Cisco Systems, available at <<www.cisco.com, accessed Jun. 6, 2003>>, 3 pages.
"The ABC's of IP Version 6: Understanding the Essentials Series," Cisco Systems, available at <<www.cisco.com/go/abc>>, 76 pages.
AOL Instant Messenger homepage, provided by America Online of Dulles, VA, available at [[http://www.aim.com/]], accessed on Nov. 8, 2005, 1 page.
MSN Messenger homepage, provided by Microsoft Corporation of Redmond, WA, available at [[http://messenger.msn.com/Xp/Default.aspx]], accessed on Nov. 8, 2005, 2 pages.
Yahoo! Messenger homepage, provided by Yahoo! of Sunnyvale, CA, available at [[ http://messenger.yahoo.com/?ovchn=GGL&ovcpn=US_Can_Branded-Generic&ovcrn=yahoo+messenger&ovtac=PPC]], accessed on Nov. 8, 2005, 2 pages.
Aaron of Borg, "Yahoo Messenger 5.5 Hidden Smileys", retrieved Jun. 7, 2008 at <<http://www.eeggs.com/items/36761.html>>, The Easter Egg Archive, Version 5.5, Oct. 10, 2002, pp. 1-2.
Copeland, "E-mail's Signature Smiley Face is Long in the Tooth", retrieved Jun. 8, 2008 at <<http://www.pittsburghlive.com/x/pittsburghtrib/s_92452.html>>, Pittsburgh Tribune Review, Sep. 20, 2002, pp. 1-3.
"Must Read: Signature/Avatar Rules", retrieved Jun. 7, 2008 at <<http://web.archive.org/web/20031002014646/forums.allalias.com/index.php?>>, AllAlias.com, May 23, 2003, pp. 1-8.
"Smiley Emoticons", retrieved Jun. 7, 2008 at <<http://www.ultimatemetal.com/forum/power-omens/46652-smiley-emoticons.html>>, Ultimate Metal Forum, Sep. 5, 2002, pp. 1-9.
"Trillian Emoticons", retrieved Jun. 8, 2008 at <<http://www.bigblueball.com/forums/trillian/14101-trillian-emoticons.html>>, BigBlueBall Forums, Aug. 7, 2002, pp. 1-6.
"Yahoo! Emoticons for Yahoo Messenger & Java Chat Applet" retrieved Jun. 7, 2008 at <<http://syntetica.eng.uci.edu/>>, Synthetica, Sector #101, pp. 1-7.

* cited by examiner

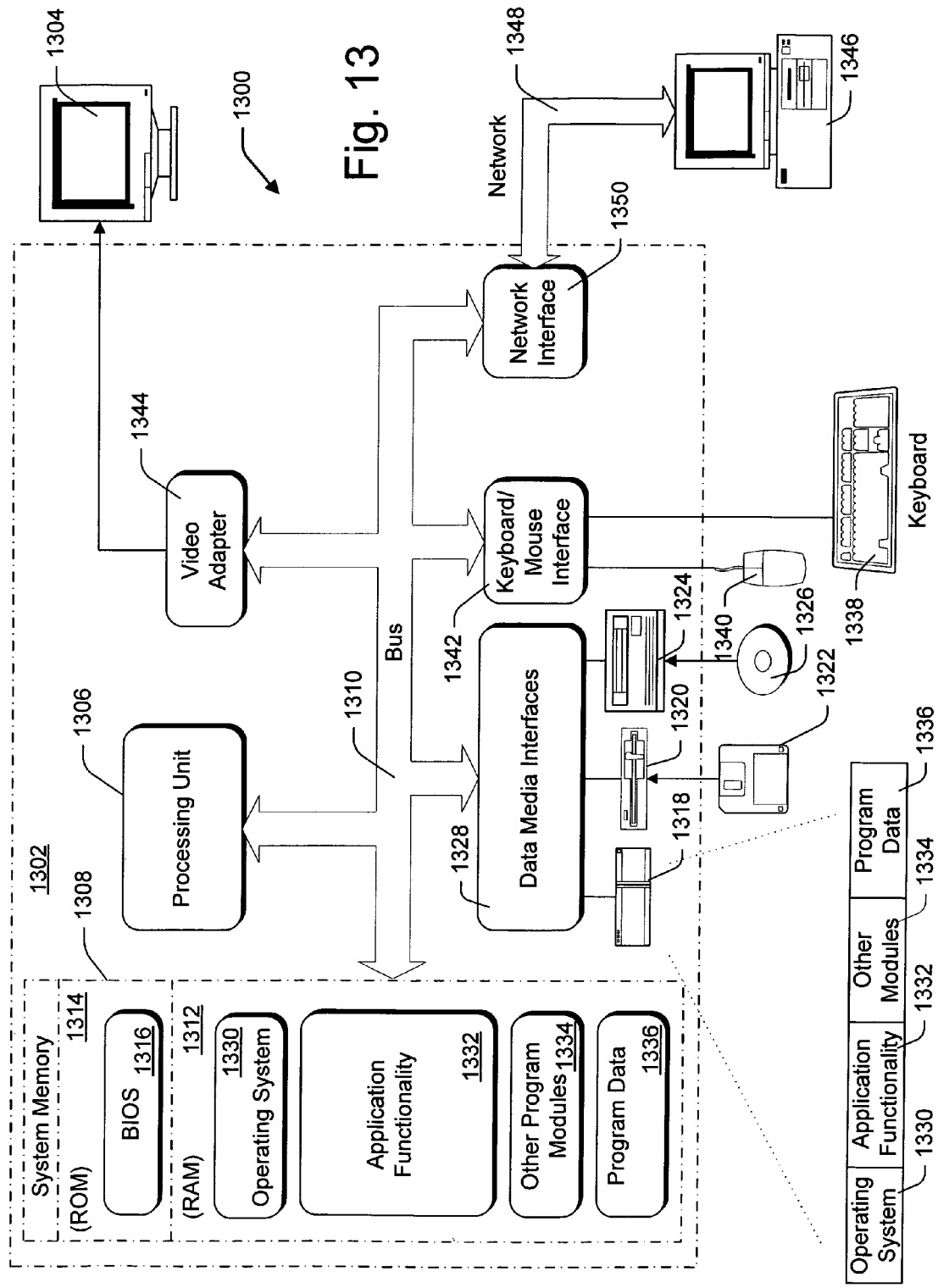

PEER-TO-PEER MULTICASTING USING MULTIPLE TRANSPORT PROTOCOLS

REFERENCE TO COPENDING APPLICATIONS

This application is related to the following co-pending and commonly assigned U.S. patent applications: Ser. No. 10/611,575, entitled "Transport System for Instant Messaging," filed on Jul. 1, 2003, naming John S. Holmes et al. as inventors; and Ser. No. 10/987,396, filed on Nov. 12, 2004, entitled "Strategies for Peer-to-Peer Instant Messaging," naming Carmen Zlateff et al. as inventors. Both of the above-identified applications are incorporated herein by reference in their respective entireties.

TECHNICAL FIELD

This subject matter relates to strategies for conducting a peer-to-peer communication session among a plurality of participants.

BACKGROUND

Peer-to-peer (P2P) systems employ a network which connects participating machines together in a decentralized manner. That is, in a P2P system, a first participant may be directly coupled to a second participant; or the first participant may be coupled to the second participant through a chain of one or more intermediate participants. For example, FIG. 1 shows a high-level depiction of a P2P system 100. The system 100 includes a collection of peer entities (102-112). The peer entities (102-112) can comprise personal computer devices that are coupled together via any network or combination of networks (such as the Internet). In the exemplary case of FIG. 1, each peer entity (102-112) is connected to all other peer entities (102-112). In other cases, one or more peer entities (102-112) may be connected to other peer entities (102-112) via one or more intermediary participants (102-112). A general survey of different P2P systems can be found in D. S. Milojicic, V. Kalogeraki, R. Lukose, K. Nagaraja, J. Pruyne, B. Richard, S. Rollins, and Z. Xu., "Peer-To-Peer Computing," Technical Report HPL-2002-57, HP Lab, 2002.

In use, any pair of directly connected peer entities (102-112) can directly transfer files or other information between themselves (as indicated by the exemplary communication path 114 between peer entity 104 and peer entity 106). Any pair of indirectly connected peer entities (102-112) can transmit information between themselves via one or more intermediary peer entities (102-112) (which act to relay the information). These provisions allow any two peer entities (102-112) to exchange information without the aid of a server (or with only minimal set-up tasks performed by the server). The P2P system 100 can also include multicasting functionality for disseminating information to a plurality of peer entities. For instance, the multicasting functionality can propagate information from any peer entity to all of the other peer entities (102-112). The multicasting functionality can also provide a mechanism for synchronizing the individual stores (not shown) maintained by the respective peer entities (102-112). This ensures that the peer entities (102-112) maintain the same replicated information in their respective stores. One feature enabled by the multicasting functionality is real-time peer-to-peer communication among multiple participants.

The above-described P2P system 100 can be implemented using a logical overlay that defines a collection of interconnected nodes. That is, individual nodes represent peer entities (102-112) in the P2P system 100, and the nodes collectively form a logical mesh (or, in the terminology used herein, a logical "graph"). In this graph, nodes can transmit information to other nodes, either in direct fashion or via one or more intermediary relay nodes. Physically, however, the P2P system 100 can rely on an underlying transport protocol to transfer information between peer entities (102-112). For example, one exemplary version of Microsoft® Windows® Peer-to-Peer Networking functionality uses IP Version 6 (IPv6) to couple peer entities together. In the context of FIG. 1, use of a single transport protocol means that all of the links that connect the peer entities (102-112) together are implemented as IPv6 links (including, for example, representative link 114).

There is room for improvement to known P2P systems. For example, the above transport strategy works well in those cases where all of the peer entities (102-112) within the P2P system 100 are capable of communicating with each other using the implemented transport protocol (e.g., IPv6). If this is not the case, however, this solution will fail to provide a mechanism for connecting all of the participants together. For example, any single protocol may be particularly ill-equipped to connect participants together when those participants are coupled to a network behind various firewalls, network address translators (NATs), and so forth.

As appreciated by the present inventors, there is also a more general need to adapt a P2P system such that its native transport mechanism (such as above-described IPv6 transport mechanism) can be conveniently replaced with another transport mechanism, so as to best accommodate the needs of a target environment in which the P2P system is being deployed.

For at least the above-identified reasons, there is an exemplary need to provide P2P systems that provide more versatile connectivity mechanisms.

SUMMARY

According to one exemplary implementation, communication functionality is described for communicating among a plurality of participants. The communication functionality includes peer-to-peer overlay functionality (PPOF) configured to establish a peer-to-peer overlay network that includes a plurality of participants. The communication functionality also includes endpoint provider functionality (EPPF) configured to establish a transport strategy used to exchange information among the plurality of participants in the peer-to-peer overlay network. The transport strategy accommodates multiple different protocols for exchanging information among the plurality of participants, allowing different pairs of participants to communicate with each other using different respective transport protocols.

According to another exemplary feature, a PPOF address space is associated with the P2P overlay functionality and an EPPF address space is associated with the endpoint provider functionality. The communication functionality further comprises address translation functionality that is configured to translate address information from the PPOF address space to the EPPF address space, and from the EPPF address space to the PPOF address space.

According to another exemplary feature, the above-identified providing of the endpoint provider functionality comprises associating the endpoint provider functionality with the peer-to-peer overlay functionality as an agent that will be used to exchange information among the plurality of participants.

Additional exemplary implementations are described in the following.

BRIEF DESCRIPTION OF THE DRAWINGS

FIG. 13 shows an exemplary computer environment for implementing aspects of the communication functionality shown in previous figures.

Figure 1:
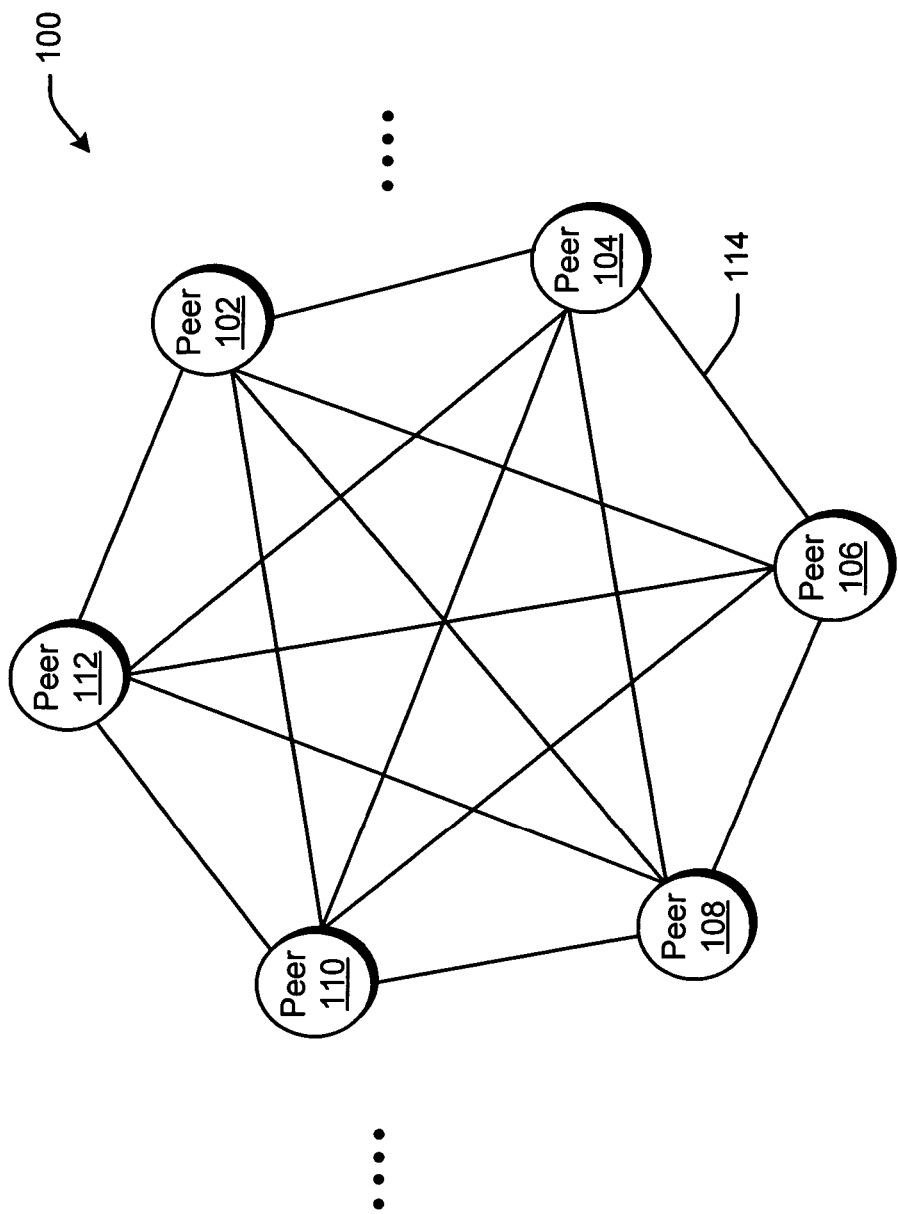
FIG. 1 shows a conventional peer-to-peer (P2P) system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth communication functionality that includes peer-to-peer (P2P) overlay functionality (PPOF) and endpoint provider functionality (EPPF) which can be "plugged into" the PPOF. That is, the PPOF provides an overlay network that logically couples a plurality of nodes together to form a graph. The nodes in the graph represent participants of a P2P system. The EPPF provides a transport mechanism for handling the actual exchange of information between nodes of the PPOF. In one implementation, an application can use the services of the PPOF to perform multi-party communication, while the PPOF can rely on the EPPF to handle the actual exchange of information among the participants of the multi-party communication.

In one exemplary implementation, the transport mechanism of the EPPF accommodates multiple transport protocols. That is, the transport mechanism selects, for each pair of participants in the P2P system, a transport protocol that is optimally suited to exchange information between these two participants. As a result, a single P2P system can employ multiple different transport protocols for exchanging messages between different pairs of participants.

According to another exemplary feature, the PPOF can use a PPOF address space and the EPPF and the application can use an EPPF address space. In other words, the PPOF can use a PPOF addressing scheme to identify participants of a communication session and the EPPF can use an EPPF addressing scheme to identify the same participants. For example, PPOF can identify participants using IPv6 addresses, while the EPPF can identify participants using user names (associated with Email accounts). As will be set forth in greater detail below, the EPPF can include address translation functionality (ATF) for translating address information from the PPOF address space to the EPPF address space, and from the EPPF address space to the PPOF address space. (As will also be set forth in connection with FIG. 8, the EPPF can be said to use the EFFP address space in the sense that the upper layers of its transport mechanism identify participants using the EFFP address space; however, in some exemplary implementations, the lower levels of the transport mechanism can rely on one or more transport protocols that operate in respective address spaces which may differ from the EPPF address space and the PPOF address space.)

The provisions described herein confer a number of benefits. According to one benefit, communication functionality can be provided that has a more versatile mechanism for exchanging information among participants (compared to the counterpart system 100 shown in FIG. 1). This feature better ensures that all of the participants within a communication session will be able to communicate with each other. This benefit is made possible, in part, by the use of the above-described unique transport mechanism, which accommodates multiple transport protocols.

According to another benefit, the communication functionality provides a flexible technique for coupling the PPOF and the EPPF together. For example, as will be described in greater detail below, an application (or other entity) can initialize the PPOF by registering a desired EPPF for use in conjunction with the PPOF. The PPOF thereafter seamlessly interacts with the EPPF as if the EPPF was an integral part of the PPOF. But, in fact, the PPOF and the EPPF can be developed separately, and different EPPFs can be "plugged into" the PPOF depending on the respective needs of different environments. This EPPF-interchangeability is made possible, in part, through the use of an interface mechanism through which the PPOF and the EPPF can interact with each other. This EPPF-interchangeability also ensues from the EPPF's use of the ATF, which converts between the address space used by the PPOF and the address space used by the EPPF (without requiring either of these functionalities to be redesigned in order to accommodate the other).

According to a related benefit, an application can make use of a new transport mechanism by "plugging in" a new EPPF that provides the new transport mechanism. To accommodate the new EPPF, the application does not need to modify the interfaces used to interact with the PPOF, as the PPOF has been specifically designed to work with different types of EPPFs.

Additional features and attendant benefits of the strategies will be set forth in this description.

As to terminology, the term "information" refers to any kind of information that I can be transmitted among participants of a P2P system, such as files, images, custom tiles, instant messenger (IM) messages, programs, and so forth.

The term "direct coupling" (or synonymously, "peer-to-peer (P2P)" coupling) refers to any kind of coupling strategy that logically connects participants together using a direct connection (which may or may not involve the use of one or more intermediary participants to relay information). More specifically, the term "direct connection" traditionally connotes that the participants exchange information without the use of an intermediary routing server (or other functionality). However, this disclosure also uses the term "direct coupling" to refer to the case where an intermediary server (or other functionality) may be involved in the exchange of information between at least some of the participants of the P2P system. More specifically, the modifier "direct" in this context implies that, considered on a logical plane, the PPOF assumes that the participants are directly connected together, although, in fact, the underlying transport mechanism may decide that it is optimal that these participants be physically coupled together via an intermediary relay server (or other functionality).

The term "transport mechanism" refers to a general strategy used to couple participants of the P2P system together, encompassing a plurality of different transport protocols. The term "transport protocol" refers to a specific approach used to couple two participants together. A synonym for "transport protocol," as used herein, is "transport handler."

This disclosure includes the following sections. Section A presents exemplary communication functionality for transmitting information among participants of a P2P system. Section B presents a series of flowcharts which describe the operation of the communication functionality. Section C describes an exemplary computer environment for implementing aspects of the communication functionality.

A. Exemplary System (FIGS. 2-10)

Generally, any of the functions described with reference to the figures can be implemented using software, firmware (e.g., fixed logic circuitry), manual processing, or a combination of these implementations. The term "logic, "module" or "functionality" as used herein generally represents software, firmware, or a combination of software and firmware. For instance, in the case of a software implementation, the term "logic," "module," or "functionality" represents program code (or declarative content) that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. Overview of Exemplary P2P Multicasting Strategy (FIGS. 2 and 3)

Figure 2:
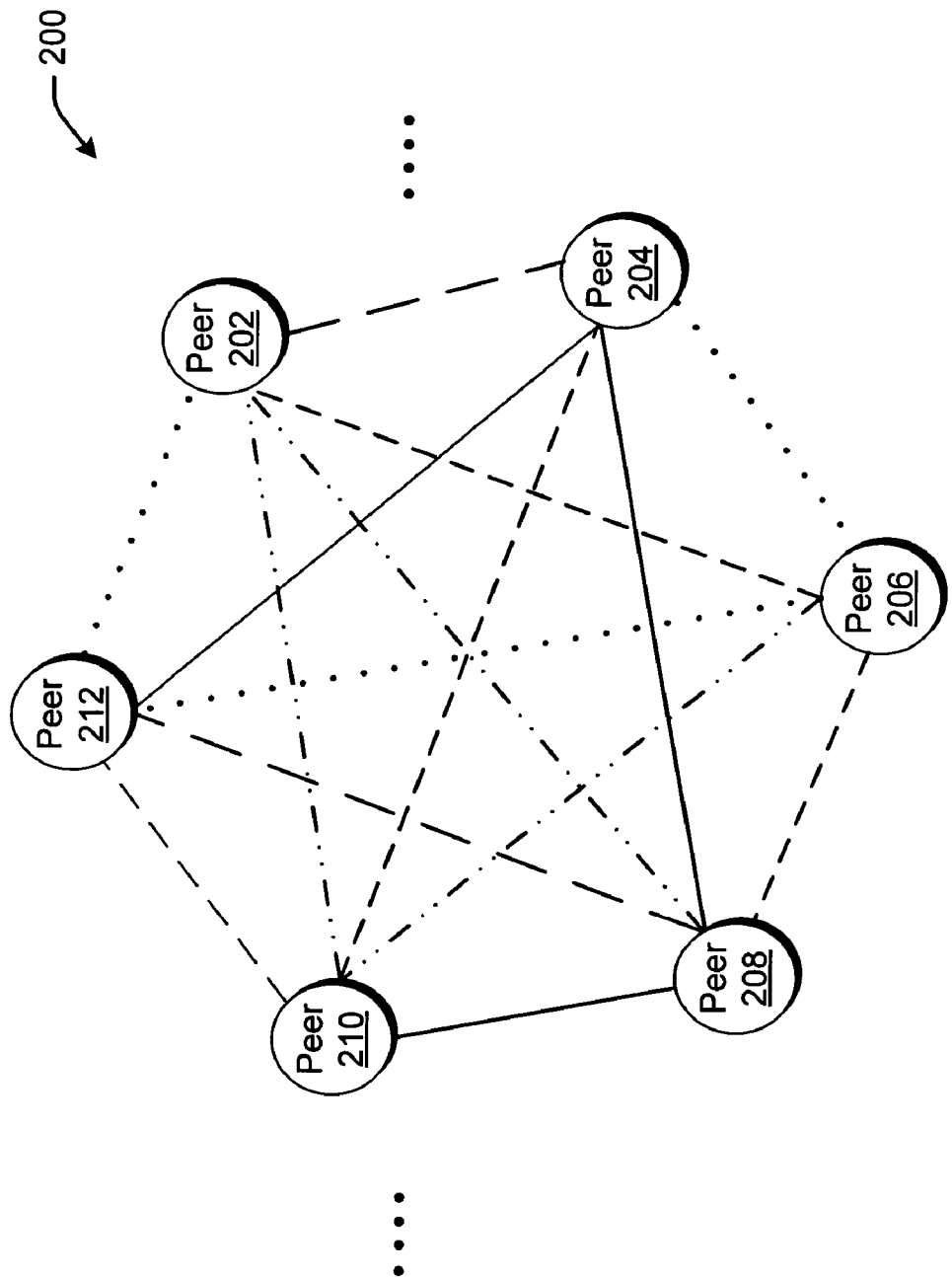
FIG. 2 shows an improved P2P system according to the present invention that includes a transport mechanism that can accommodate multiple transport protocols.
Figure 3:
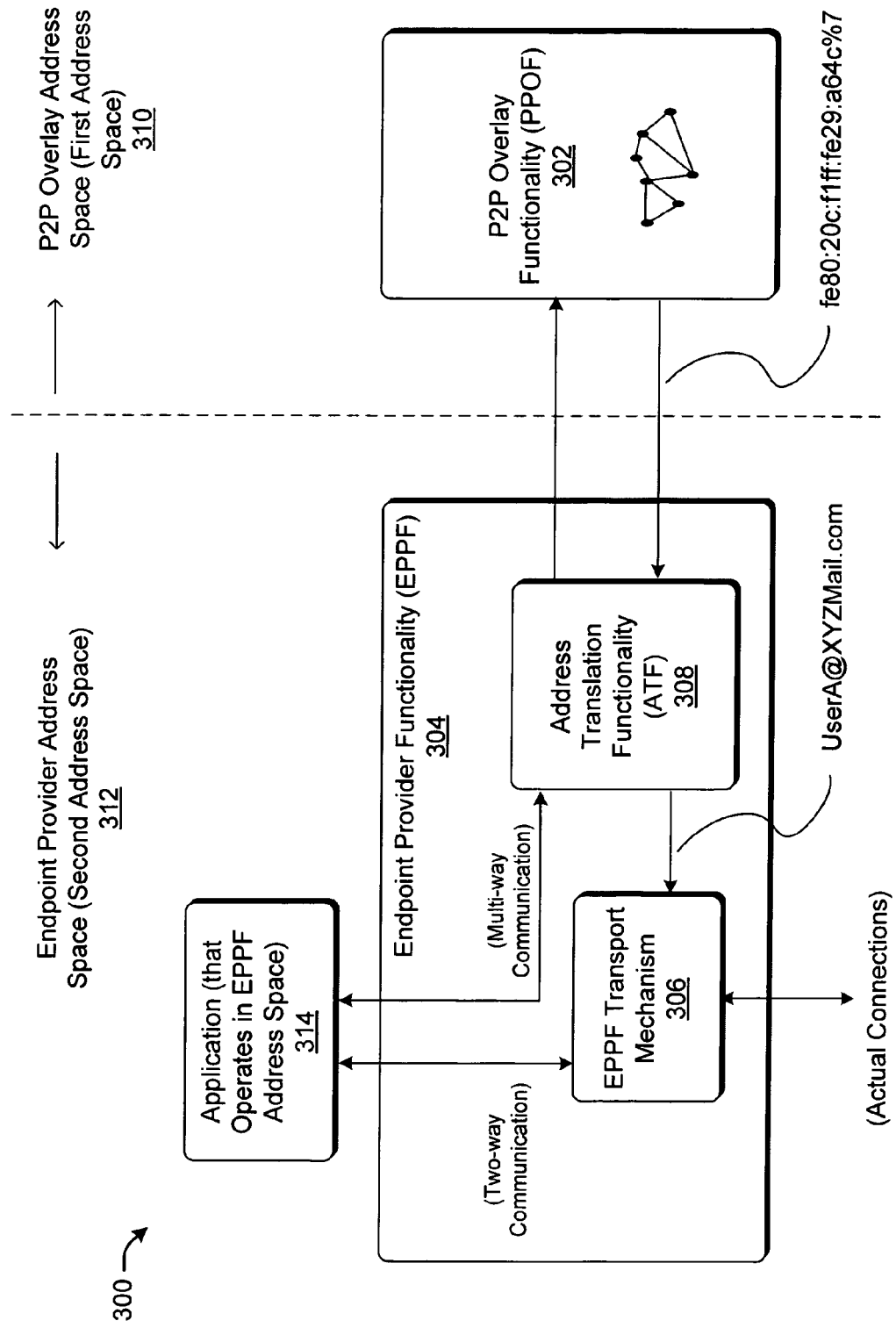
FIG. 3 shows an overview of exemplary communication functionality that can implement the P2P system of FIG. 2.

FIG. 2 shows a high-level depiction of a P2P system 200 that incorporates a transport strategy that accommodates multiple transport protocols. The system 200 includes a collection of peer entities (202-212). FIG. 2 corresponds to an exemplary implementation in which each of the peer entities (202-212) is coupled to each of the other peer entities (202-212). But the principles described herein are also applicable to the case in which there is not a direct connection between all peer entities (202-212); namely, in this case, one or more peer entities (202-212) can be connected together in indirect fashion via one or more intermediate peer entities (202-212) which act as relays. The peer entities (202-212) can be implemented as any variety of processing devices that allow participants to interact with each other. In one application, the participants can use the system 200 to conduct a real-time communication session (e.g., a chat session).

Unlike the counterpart case of FIG. 1, the links between the peer entities (202-212) can be implemented using different kinds of transport protocols (rather than a singular transport protocol). More specifically, the different types of lines shown in FIG. 2 graphically illustrate different respective types of transport protocols used to connect peer entities (202-212). That is, the solid, dashed, dotted, etc. lines represent different respective types of transport protocols. Exemplary transport protocols include various versions of the Transmission Control Protocol/Internet Protocol (TCP/IP), the Universal Datagram Protocol (UDP), various proprietary protocols, and so forth. Further, some of the transport protocols may directly exchange information between peer entities (202-212), while other of the transport protocols may indirectly exchange information between peer entities (202-212) via a routing server (such as a switchboard), or using other functionality. The use of different transport protocols (as opposed to a single transport protocol as shown in FIG. 1) better ensures that participants in the P2P system 200 can exchange information with each other. This feature may prove to be especially valuable in those scenarios in which the P2P system 200 includes intermediary equipment in the communication paths, such as firewalls and network address translators (NATs). This is because such equipment may preclude the use of some transport protocols (but not others).

Subsection A.2 (below) provides additional information regarding one exemplary implementation of the P2P system 200.

FIG. 3 shows exemplary communication functionality 300 that can implement the P2P system 200 of FIG. 2. The communication functionality 300 includes P2P overlay functionality (PPOF) 302 that is communicatively coupled to endpoint provider functionality (EPPF) 304.

The PPOF 302 defines a collection of nodes. Individually, the nodes represent participants of the P2P system 200. Collectively, the nodes represent an interconnected mesh (or "graph," according to the terminology used herein). The organization of nodes in the graph is a logical construct. For instance, the graph may indicate that two nodes are directly coupled together. However, physically, these two nodes may be connected together using an indirect connection strategy. For example, the P2P system 200 may physically connect these nodes together via a routing server, etc.

Subsection A.3 (below) provides additional information regarding one exemplary implementation of the PPOF 302.

On the other hand, one role of the EPPF 304 is to actually (i.e., physically, rather than logically) implement the connections between nodes in the graph. The EPPF 304 can perform this function using a multi-protocol transport mechanism 306. That is, this transport mechanism 306 accommodates the use of the different kinds of transport protocols represented by the different style lines shown in FIG. 2. It executes this task by performing analysis, for each link connecting two participants, to determine which transport protocol is best suited to exchange information between the two participants.

The EPPF 304 also includes address translation functionality (ATF) 308. The purpose of the ATF 308 is to convert address information from an address space used by the PPOF 302 ("the PPOF address space" 310) to an address space 312 used by the EPPF 304 and an application 314 ("the EPPF address space" 312), and to also convert from the EPPF address space 312 to the PPOF address space 310. The term "address space" refers to a mode of identifying participants in the P2P system 200. It should be noted that these address spaces identify the same participants, but do so using a different addressing formats (analogous to expressing the same number in binary format or hexadecimal format).

More specifically, consider the exemplary case in which the PPOF 302 is designed having a native transport mechanism (and associated data structures). This native transport mechanism identifies participants using a prescribed addressing scheme, such as IPv6. However, due to the modularity in the design of the communication functionality 300, the EPPF 304 can identify participants using a different addressing scheme. For example, the transport mechanism 306 of the EPPF 304 may identify participants using user names associated with Email accounts. The role of the ATF 308 in this scenario is twofold. First, when the EPPF 304 forwards address information to the PPOF 302, the ATF 308 must convert the address information from the user name format to the IPv6 format. Second, when the EPPF 308 receives address information from the PPOF 302, it must convert the address information from the IPv6 format to the user name format. (Of course, the use of IPv6 and user name address spaces is merely illustrative; this example does not limit the use of the communication functionality 300 in a wide variety of environments that use different addressing schemes to identify participants.)

In this exemplary case, the ATF 308 is shown as a component of the EPPF 304. However, in other implementations, the ATF 308 can be implemented by the PPOF 302, or can be implemented by both the EPPF 304 and the PPOF 302, or can be implemented as a standalone component.

Subsection A.4 (below) provides additional information regarding one exemplary implementation of the EPPF 304, including the transport mechanism 306 (in section A.4.2) and the ATF 308 (in section A.4.3).

A specific example will further clarify the features of the communication functionality 300 shown in FIG. 3. Consider the exemplary scenario in which the application 314 is originally designed to use the transport mechanism 306 as its native transport mechanism to transmit information between two participants. The application 314 can be modified to accommodate multi-party communication (including three or more participants) by relying on the PPOF 302. More specifically, the application 314 can be configured to interact with the PPOF 302 when a multi-party information exchange is initiated by a participant. In addition, the system 300 can be configured such that the PPOF 302 uses the EPPF 304's transport mechanism 306, instead of the PPOF 302's native transport protocol. Thus, in operation, the application 314 accesses the PPOF 302 (via the ATF 308) to make use of the PPOF 302's core services (e.g., information flooding and data store synchronization within a graph), while the PPOF 302 accesses the transport mechanism 306 (via the ATF 308) to perform the actual connection between nodes in the graph.

Different strategies can be used to associate a particular EPPF 304 with the PPOF 302, so that the PPOF 302 will rely on the EPPF 304 as its endpoint provider (rather than the PPOF 302's native transport protocol). In one case, the application 314 can register the EPPF 304 with the PPOF 302. In another case, the EPPF 304 can register itself with the PPOF 302. For instance, suppose that there is only one PPOF 302; in this case, the EPPF 304 can register itself with the PPOF 302 when the application 314 starts up the EPPF 304. Still other registration protocols are possible. (Further note that FIG. 3 shows a single application 314 that utilizes the services of a single EPPF 304; however, more generally, any number of applications can make use of a single EPPF 304, or a single application can potentially make use of plural EPPFs. In one design approach, the applications and EPPFs can be designed in a modular fashion, so that an application can swap one EPPF for another without necessitating redesign of the application or the EPPFs.)

As another feature, assume that the address space scenario set forth above applies here. In this case, the application 314 and the EPPF 304 identify participants using user name information. However, as mentioned, the PPOF 302 might use some other native address space to identify the participants, such as IPv6. To avoid the need to completely reconfigure the PPOF 302 to make its address space conform to the EPPF 304's address space (or vice versa), the EPPF 304 employs the ATF 308 to convert between the user name address space (used by the application 314) and the IPv6 address space (used by the PPOF 302).

To clarify the above topic of address spaces, the EPPF 304 (including its transport mechanism 306) can be said to employ the user name address space because that is the format by which it abstractly identifies participants. It should be noted, however, that the transport mechanism 306 includes multiple layers. The top layers include interfaces which identify the participants using the user name address space. But to achieve the above-described multi-protocol capabilities, the lower levels can accommodate many different transport protocols. These lower levels may rely on their own respective address spaces to identify and connect to participants. Nevertheless, to simplify the remaining discussion, the EPPF 304 will be said to work within a single EPPF address space (such as a user name address space). This is true in the sense that, from a top level perspective, and also from the perspective of the PPOF 302, the EPPF 304 identifies participants using a single EPPF address space. In other words, the transport mechanism 306 is designed such that what is happening at its lowest transport level can effectively be ignored by applications that interact with the transport mechanism 306.

A.2. Overview of Exemplary System that Implements the Strategy (FIGS. 4 and 5)

Figure 4:
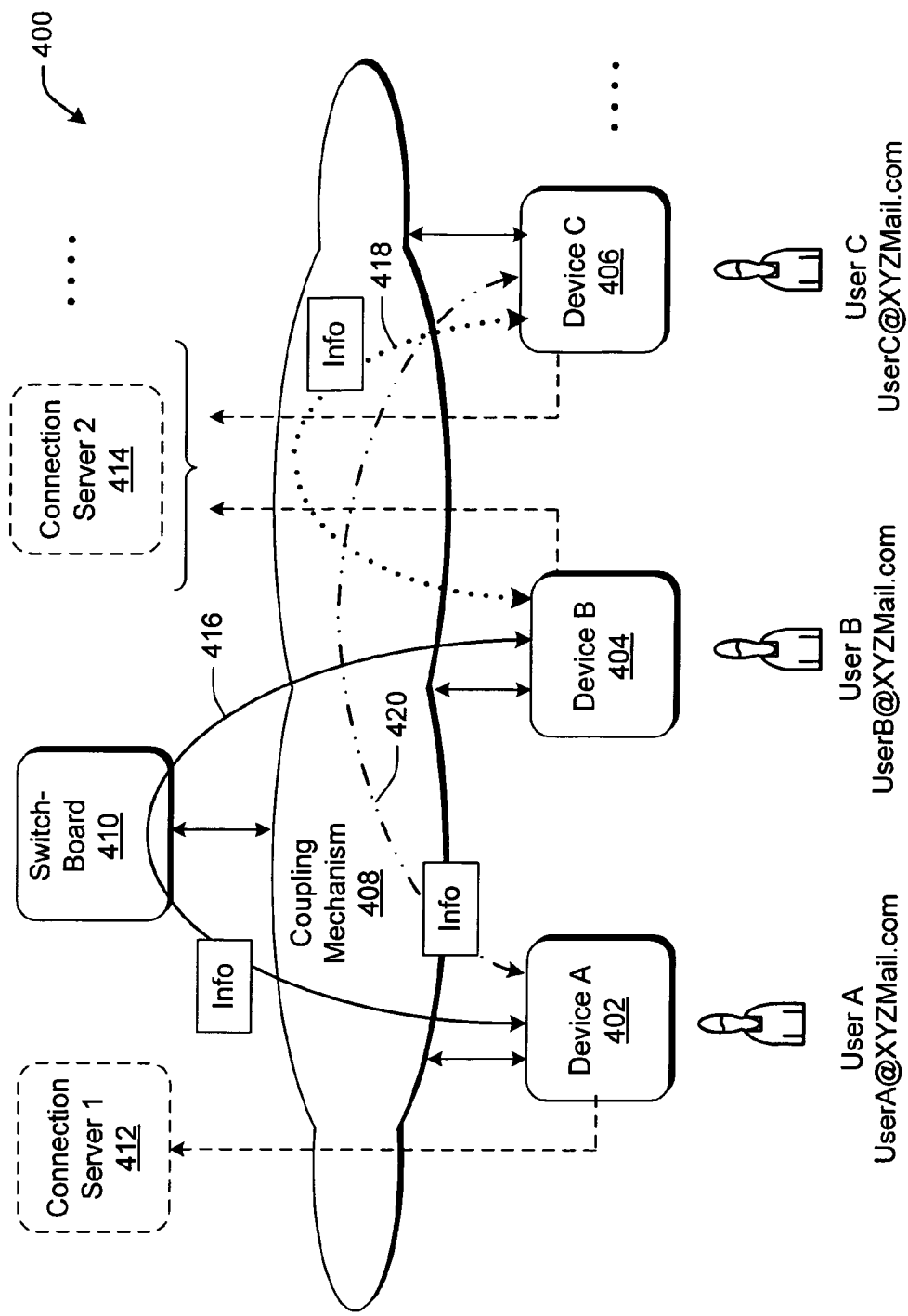
FIG. 4 shows a specific system that implements one exemplary instance of the P2P system of FIG. 2.
Figure 5:
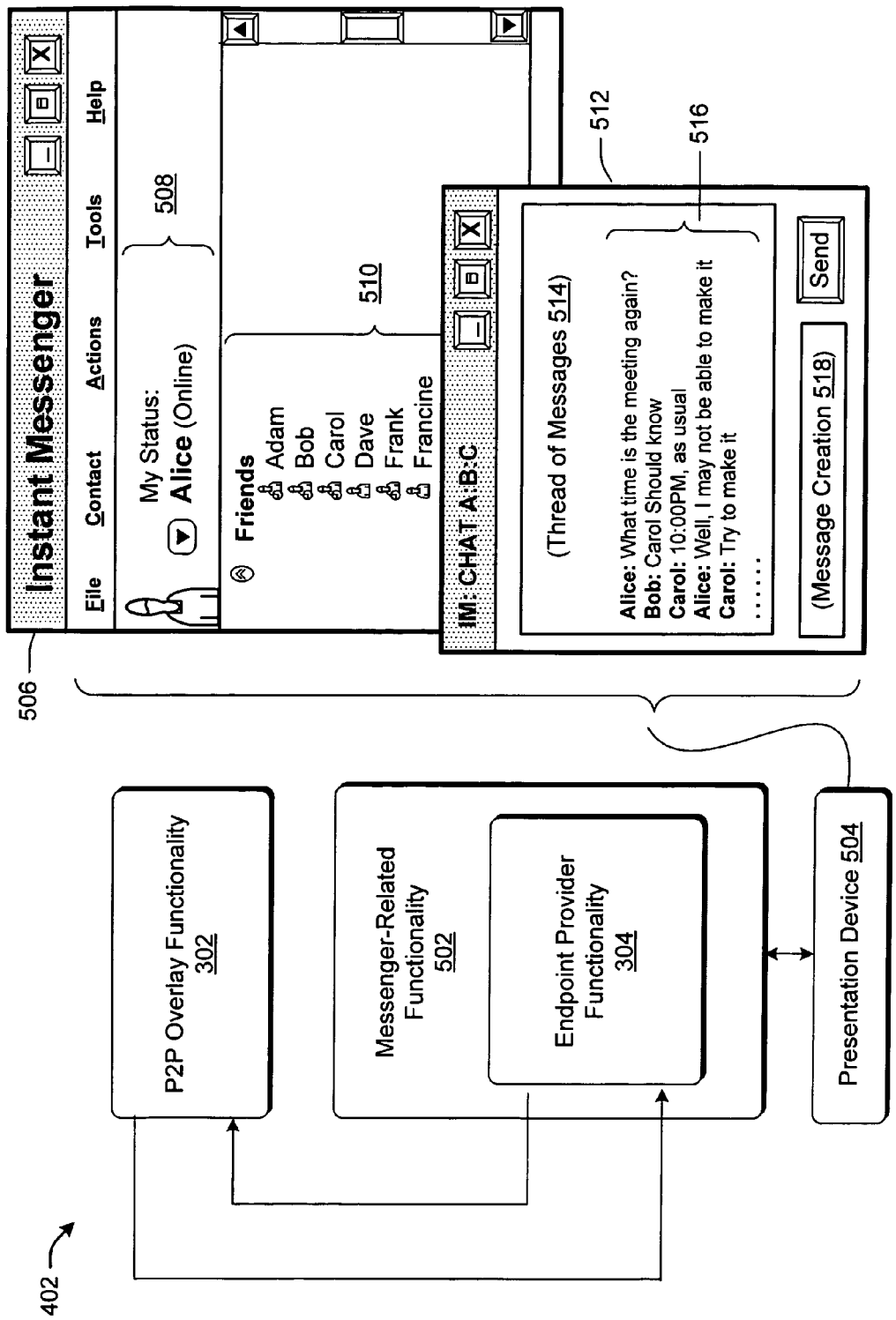
FIG. 5 shows an exemplary client device for use in implementing the P2P system of FIG. 2.

FIG. 4 shows a system 400 that illustrates one exemplary implementation of the P2P system 200 (of FIG. 2) and associated communication functionality 300 (of FIG. 3). The system 400 pertains to an exemplary scenario is which there are three participants, user A (Alice), user B (Bob) and user C (Carol). Of course, the system 400 can accommodate many more participants (not shown). The system 400 pertains to an exemplary scenario in which messenger-related functionality (not shown) is provided to allow the participants to communicate with each other in a multi-party real-time chat session.

To begin with, FIG. 4 shows that the participants (A, B, and C) operate three respective participant devices (402, 404, 406), corresponding to three of the peer entities (202-212) introduced in the context of FIG. 2. The participant devices (402, 404, 406) can generally comprise any type of processing devices for sending and/or receiving messages. For example, the participant devices (402, 404, 406) can be implemented as general purpose computers (such as personal computers), portable computers (e.g., laptop computers, mobile telephone devices, various kinds of wearable computers, etc.), and so forth. Or the participant devices (402, 404, 406) can be implemented as application-specific consoles (such as Microsoft Corporation's Xbox™ game consoles, set-top television boxes, and so forth). Still other implementations are possible. In any case, the participant devices (402, 404, 406) can include any combination of computer hardware and logic functionality, including one or more processors, RAM memory, ROM memory, one or more media drives, one or more storage units, one or more input devices, and so on. FIG. 5 describes exemplary software components of the participant devices (402, 404, 406), while FIG. 13 describes exemplary hardware components of the participant devices (402, 404, 406).

A coupling mechanism 408 couples all of the participant devices (402, 404, 406) together. The coupling mechanism 408 can include any kind of routing infrastructure or combination of routing infrastructures. For instance, the coupling mechanism 408 can include any combination of wide area network, local area network, point-to-point connectivity, and so on. In one example, the coupling mechanism 408 can utilize the communication resources of the Internet. The coupling mechanism 408 can also include various routers, gateways, etc. (not shown). The communication links employed by the coupling mechanism 408 can include any combination of hardwired links (conventional copper, optical, cable, etc.), wireless links, etc.

In an instant messenger (IM) context, the system 400 can include various servers devoted to the task of facilitating the exchange of IM information. (As well understood in the art, a "server" generally refers to a computer device configured to deliver functionality to other devices using a client-server mode of interaction. A server can include any combination of computer hardware and logic functionality, including one or more processors, RAM memory, ROM memory, one or more media drives, one or more storage units, one or more input devices, and so on.) For instance, the system 400 can provide a switchboard 410 (or plural switchboards, not shown). The switchboard 410 serves the purpose of exchanging setup information between the participant devices (402, 404, 406), and can also route IM information between participant devices (402, 404, 406) for some transport protocols. The system 400 can also provide plural connection servers, such as exemplary connection server (1) 412 and connection server (2) 414. In this illustrated scenario, when participant device A 402 first logs on, it connects to connection server 412. When participant devices B and C (404, 406) log on, they connect to connection server 414. The connection servers (412, 414) facilitate the preparatory exchange of control information to establish a connection. However, it should be noted that the system 400 is merely one example; other implementations can entirely dispense with switchboards and connection servers, or can provide additional network functionality (not shown).

FIG. 4 also illustrates the concept introduced in FIG. 2, namely, that the communication functionality 300 can use different transport protocols to connect different pairs of participant devices (402, 404, 406) together. For example, a first path 416 connects participant device A 402 with participant device B 404, and is used to exchange information between these participant devices (402, 404). A second path 418 connects participant device B 404 with participant device C 406, and is used to exchange information between these participant devices (404, 406). A third path 420 connects participant device A 402 with participant device C 406, and is used to exchange information between these participant devices (402, 406). FIG. 4 corresponds to the exemplary case where each participant is connected to each of the other participants in direct fashion; but the EPPF 304 described above can also be applied to meshes in which some of participants may be connected together only through one or more intermediary participants.

Note that path 416 uses the switchboard 410 to connect participant devices A 402 and B 404 together, while the other two paths (418, 420) do not rely on the switchboard 410. In other words, paths 418 and 420 provide direct coupling between the participants, e.g., between participant devices B 404 and C 406, and between participant devices A 402 and C 406. At the same time, path 418 uses a different direct transport protocol than path 420. For example, path 418 might use UDP over IPv4 to transfer information between participants (404, 406), while path 420 might rely on UDP over IPv6 to transfer information between participants (402, 406).

The transport strategy used to select a transport protocol to use in connecting together two participant devices will be described below in Subsection A.4.2. By way of introduction, in one exemplary case, a first participant device can form a list of possible transport protocols that it can use to establish a link with a second participant device. The first participant device can then forward this list to the second participant device. This will prompt the second participant device to select one transport protocol from the list and communicate that selection back to the first participant device. The second participant device can make this selection based on its ranking of preference-related scores in a manner to be described below. The transport strategy can use a reliable (although perhaps not the most efficient) transport path to exchange the above-described setup information. For instance, the transport strategy can use the switchboard 410 to exchange the setup information, but may then switch to a direct coupling between participants depending on the results of the setup analysis.

Through the above-described intelligent selection of transport protocols, the system 400 better enables any two participants to communicate with each other using the most efficient channel.

The communication functionality 300 shown in FIG. 3 has other uses and attendant benefits. For example, suppose that device C 406 needs to flood information to devices A 402 and B 404. In the event that device C 406 cannot execute this flooding quickly (for any reason), then it can defer this multicasting responsibility to a server (e.g., the switchboard 410). That is, the server could cache the information received from device C 406 and then relay it down to devices A 402 and B 404.

FIG. 5 shows an exemplary implementation of the representative participant device A 402 (introduced in FIG. 4). Other participant devices (404, 406, . . . ) can adopt a similar composition. The participant device A 402 can include messenger-related functionality 502 coupled to a presentation device 504. The messenger-related functionality 502 can include logic for implementing messenger-related tasks. The presentation device 504 can comprise any device for interacting with the participant. It preferably comprises a display device of some nature, such as a CRT-type device, an LCD-type device, and so forth. But it can also include an audible-type output device, a printer-type output device, a tactile-type output device, and so forth (or some combination thereof).

In the event that the presentation device 504 comprises a display-type device, it can provide user-interface presentations through which the participant (Alice) can interact with the messenger-related functionality 502. For example, FIG. 5 shows a first exemplary IM user interface presentation 506 that is activated when the participant logs onto an IM service. The user interface presentation 506 includes a first section 508 which provides information regarding the operator of the device 402, Alice, who is interacting with the IM service. The user interface presentation 506 also includes a second section 510 which identifies the members of Alice's IM contact list. In this case, Alice has defined a "Friends" group as part of her contact list that includes a collection of Alice's friends with whom she frequently communicates using the IM service, including Bob and Carol, among others. Alice can initiate a conversation with any member of her contact list by clicking on the name of that member in the list. This prompts the messenger-related functionality 502 to activate a separate user interface box in which Alice can interact with the selected member by sending and receiving message to/from that member.

Alice can also initiate a multi-party conversation (including three or more participants) through selection of an appropriate command on the user interface presentation 506. This prompts the messenger-related functionality 502 to activate a separate conversation user interface box in which Alice can interact with plural participants, such as both Bob and Carol. For example, FIG. 5 shows an exemplary multi-party communication box 512. This box 512 includes a first portion 514 which shows an evolving sequence of messages 516 sent by Alice, Bob and Carol. This box 512 also includes a second portion 518 which allows the operator, Alice, to enter a text message for transmission to Bob and Carol. The P2P system can transmit the message to Bob and Carol through replication functionality called flooding (to be described below). Bob and Carol operate participant devices (404, 406); each such device can provide a user interface presentation that is similar to box 512.

Returning to the left-hand portion of FIG. 5, the messenger-related functionality 502 can be implemented as software, firmware, or a combination of software and firmware. FIG. 5 shows the case where the messenger-related functionality 502 is physically incorporated into the participant device A 402 itself (e.g., as implemented by machine-readable instructions stored in one or more stores provided by the participant device A 402). Alternatively, one or more of the functions performed by the messenger-related functionality 502 can be implemented elsewhere; for instance, one or more functions can be provided by network functionality. This would correspond to the case where the IM service is enabled as a web-end service, rather than a client-end service.

However implemented, one aspect of the messenger-related functionality 502 is an application feature which implements the PPOF 302. Namely, this application feature corresponds to the functionality that is invoked when the participant, Alice, creates a multi-party communication session or joins an existing multi-party communication session. The messenger-related functionality 502 can also implement the EPPF 304 (providing the transport mechanism that accommodates plural transport protocols). Thus, the application feature can invoke the PPOF 302 to create a graph, and the PPOF 302, in turn, can interact with the transport mechanism 306 of the EPPF 304 via the ATF 308 to provide the physical coupling between links in the graph. FIG. 5 corresponds to the case where the messenger-related functionality 502 includes the EPPF 304 as an integral component thereof, but it is also possible to implement the EPPF 304 as a module that is separate from the messenger-related functionality 502.

Subsection A.4 provides additional details regarding the exemplary composition and operation of the messenger-related functionality 502.

A.3. Exemplary P2P Overlay Functionality (PPOF) (FIGS. 6 and 7)

A.3.1. Overview of the PPOF

Figure 6:
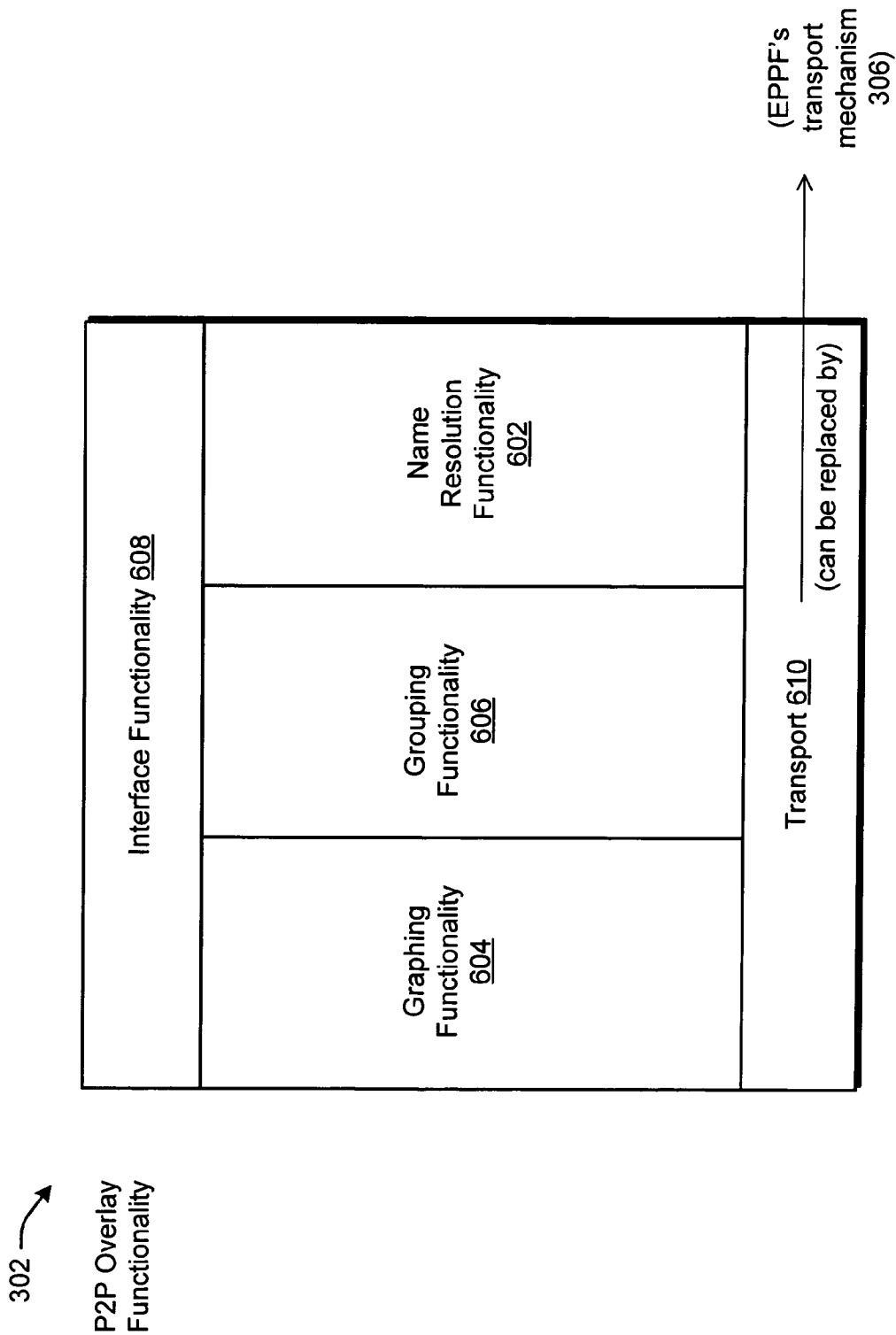
FIG. 6 shows exemplary P2P overlay functionality (PPOF) for use in the communication functionality of FIG. 3.
Figure 7:
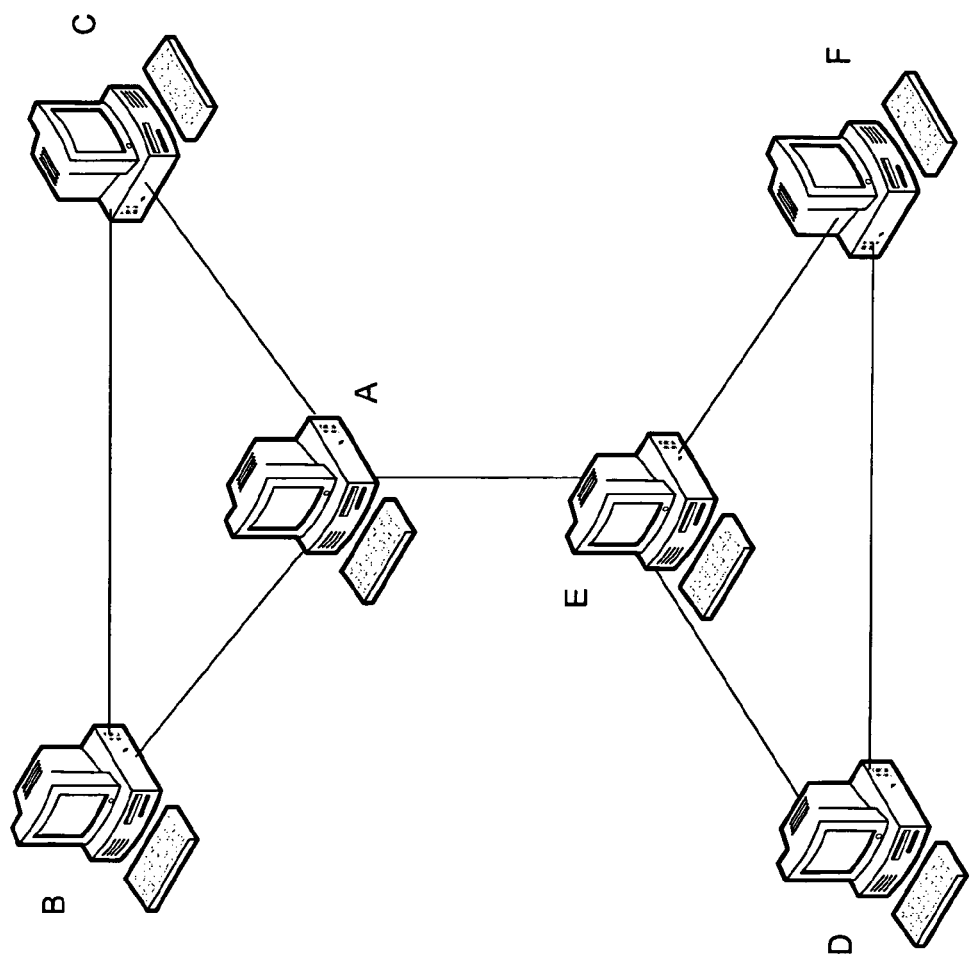
FIG. 7 shows a collection of peer entities which illustrates the operation of graphing functionality used by the PPOF of FIG. 6.

FIG. 6 identifies exemplary aspects of the PPOF 302. At the outset, it is pointed out the implementation shown in FIG. 6 is merely illustrative, corresponding to one of many possible implementations of the PPOF 302.

One aspect of the PPOF 302 shown in FIG. 6 is name resolution functionality 602. The name resolution functionality 602 provides a technique for locating peer entities within the P2P system 200. To perform this task, the name resolution functionality 602 uses a distributed hash table (DHT) to facilitate the storage and retrieval of information in the P2P system 200. As the name suggests, a distributed hash table (DHT) refers to a hash table that is distributed over plural locations, such as distributed over plural stores (caches) associated with different participant devices. A distributed hash table specifies a plurality of DHT nodes. The DHT nodes collectively define an abstract DHT logical space. A record object can be inserted into or retrieved from this DHT logical space by subjecting this object to a hashing function to produce a key. This key is then used to locate a particular target node in the DHT logical space that will receive the record object or from which the record object can be retrieved.

Another aspect of the PPOF 302 is graphing functionality 604. The graphing functionality 604 creates a mesh of interconnected nodes, referred to as a "graph" herein. More specifically, any node in the graph can be connected to the graph through a link to one or more other nodes in the graph. As previously described, the nodes in the graph represent peer entities (202-212) in the P2P system 200. But the graph itself defines an interconnection structure that logically (rather than physically) describes the connection between the peer entities (202-212).

The graphing functionality 604 includes a flooding mechanism for propagating record objects throughout the graph. For example, using the flooding mechanism, the graphing functionality 604 can disseminate a record object from any given node in the graph to all of the other nodes in the graph. The graphing functionality 604 further includes a synchronization mechanism for ensuring that all of the stores maintained by the nodes in the graph contain the same record objects. In the process of flooding, a node that is coupled to the graph via multiple neighboring nodes can potentially receive multiple copies of the same record object. To address this issue, a node includes provisions for assessing the utility of record objects that it receives; a record object that has already been received has a low utility associated therein. A node can ignore updates pertaining to record objects having low utility associated therewith.

Various events in a communication session may break the links between nodes in the graph, causing partitions in the graph. For example, a node that leaves a graph may cause a partition in the graph. To address this issue, the graphing functionality 604 includes a graph maintenance mechanism for repairing partitions in the graphs.

FIG. 7 serves as a vehicle for explaining the graph maintenance mechanism. The graph shown there includes six peer entities, A-F. When these peer entities join the graph, the graphing functionality 604 assigns a random graph ID to each of them in an internal PPOF-side ID space. In addition, the graphing functionality 604 determines a signature for the graph, which corresponds to the lowest graph ID within the graph. In addition, the graphing functionality 604 assigns one or more nodes in the graph as contact nodes; the contact nodes contain contact records (e.g., storing the graph signature) that can be accessed by other nodes in the graph in the event of a graph partition. Assume that nodes A and D have been assigned the role of contact nodes. Further assume that the signature of the graph corresponds to the graph ID of node B (e.g., ID=1).

In operation, signature information is periodically propagated through the graph (e.g., every five minutes) to alert nodes in the graph to the current signature of the graph. The nodes determine whether the received signature information matches signature information which they independently maintain in their respective record stores. Agreement between such signature information indicates that the graph remains synchronized.

Consider, however, the case in which there is a break in the graph; for example, assume that the link between nodes A and E breaks. This will cause a partition between the top three nodes (A, B and C) and the bottom three nodes (D, E and F). This will cause the bottom three nodes (D, E and F) to fail to receive signature information updates (e.g., as transmitted by node B). This, in turn, will cause the bottom three nodes to compute a new local signature based on the graph IDs associated with the bottom three nodes. The bottom three nodes will then detect a discrepancy between the newly computed signature and signature information associated with contact node A. This will prompt the bottom three nodes to establish a connection with the contact node A and thereby repair the partition (if possible).

Returning to FIG. 6, another aspect of the PPOF 302 is grouping functionality 606. A group comprises a collection of peer entities (which will form a graph when they are coupled together by the graphing functionality 604). The grouping functionality 606 assigns a unique group ID to each group that is created. After creation, the grouping functionality 606 governs various aspects of the group, such as security applied to the group, and so forth.

Another aspect of the PPOF 302 is interface functionality 608. The interface functionality 608 provides interface tools that allow the EPPF 304 and other entities to interact with the above-described functionality of the PPOF 302. Subsection A.3.2 (below) provides additional details regarding this interface functionality 608.

Another aspect of the PPOF 302 is the transport functionality 610. The transport functionality 610 implements the physical transport which links nodes in the graph together. The PPOF 302 may provide a default (native) transport protocol to perform this coupling (such as IPv6, as applied to all links in the graph). However, as set forth above, the PPOF 302 can also access a "pluggable" endpoint provider functionality (EPPF) 304 for implementing the physical transport. An application can register the pluggable EPPF 304 with the PPOF 302 to override its default transport protocol. (Alternatively, another entity can register the EPPF 304 with the PPOF 302; for example, the EPPF 304 itself can register itself as the endpoint provider of the PPOF 302.)

Additional details regarding the PPOF 302 can be found in the following commonly assigned patent applications.

U.S. Ser. No. 09/955,923, filed on Sep. 19, 2001, entitled "Peer-to-Peer Group Management and Method for Maintaining Peer-to-Peer Graphs," naming Christian Huitema et al. as inventors.

U.S. Ser. No. 10/132,018, filed on Apr. 24, 2002, entitled "Methods for Authenticating Potential Members Invited to Join a Group," naming Graham Wheeler et al. as inventors.

U.S. Ser. No. 10/122,863, filed on Apr. 15, 2002, entitled "Multi-Level Cache Architecture and Cache Management Method for Peer-to-Peer Name Resolution Protocol," naming John Miller as inventor.

U.S. Ser. No. 10/645,319, filed on Aug. 20, 2003, entitled "Peer-to-Peer Authorization Method," naming David Mowers et al. as inventors.

U.S. Ser. No. 10/69,6776 filed Oct. 30, 2003, entitled "Peer-To-Peer Cloud-Split Detection and Repair Methods," naming Christian Huitema as inventor.

U.S. Ser. No. 10/309,865, filed on Dec. 4, 2002, entitled "Peer-To-Peer Graphing Interfaces and Methods," naming Todd Manion et al. as inventors.

U.S. Ser. No. 10/351,905, filed on Jan. 27, 2003, entitled "Peer-To-Peer Grouping Interfaces and Methods," naming Todd Manion et al. as inventors.

U.S. Ser. No. 10/623,994, filed on Jul. 21, 2003, entitled "Secure Hierarchical Namespaces in Peer-to-Peer Networks," naming Graham Wheeler as inventor.

U.S. Ser. No. 10/460,943, filed on Jun. 13, 2003, entitled "Extensible Peer-to-Peer Graphing Messages," naming Xiaohai Zhang as inventor.

U.S. Ser. No. 10/702,405, filed on Nov. 5, 203, entitled "Method for Establishing and Maintaining a Shared View of Time in a Peer-to-Peer Network," naming Christian Huitema et al. as inventors.

U.S. Ser. No. 10/608,768, filed on Jun. 27, 2003, entitled "Group Security," naming Graham Wheeler et al. as inventors.

U.S. Ser. No. 10/693,228, filed on Oct. 24, 2003, entitled "Group Shared Spaces," naming Ravi Rao et al. as inventors.

U.S Ser. No. 10/692,199, filed on Oct. 23, 2003, entitled "Peer-to-Peer Identity Management Managed Interfaces and Methods," naming Todd Manion et al. as inventors.

U.S. Ser. No. 10/691,764, filed on Oct. 23, 2003, entitled "Managed Peer Name Resolution Protocol (PNRP) Interfaces for Peer to Peer Networking," naming Todd Manion et al. as inventors.

U.S. Ser. No. 10/692,501, filed on Oct. 24, 2003, entitled "File Sharing in P2P Group Shared Spaces," naming Ravi Rao et al. as inventors.

Each of the above-identified applications is incorporated by reference in its respective entirety.

However, the PPOF 302 can be implemented using other technology than that illustrated in FIG. 6. That is, the PPOF 302 can be generally implemented as any P2P overlay network that includes a mechanism for replicating information among its nodes (to implement communication among multiple participants). The overlay network can rely on any overlay paradigm, such as:

PASTRY-related techniques (note, for instance, A. Rowstron and P. Druschel, "Pastry: Scalable, Distributed Object Location and Routing for Large-Scale Peer-To-Peer Systems," 18th FIFP/ACM International Conference on Distributed Systems Platforms, Heidelberg, Germany, November 2001);

CHORD-related techniques (note, for instance, I. Stoica, R. Morris, D. Karger, M. F. Kaashoek, and H. Balakrishnan, "Chord: a Scalable Peer-To-Peer Lookup Service for Internet Applications," ACM SigComm 2001, San Diego, Calif., USA, August 2001);

CAN-related techniques (note, for instance, S. Ratnasamy, P. Francis, M. Handley, R. Karp, and S. Shenker, "A Scalable Content-Addressable Network," ACM Sig-Comm 2001, San Diego, Calif., USA, August 2001); and so forth.

A.3.2. PPOF API Functionality

The interface functionality 608 includes an interface mechanism for allowing the EPPF 304 to interact with the PPOF 302. This interface mechanism specifically permits an application (or other entity) to register a "third party" EPPF 304 for providing the physical coupling between links in the graph. The registered EPPF 304 will, in effect, override any default endpoint provider functionality supplied by the PPOF 302 itself (such as IPv6).

Exemplary interface mechanisms include the following:

A graph creation method (PEER_GRAPH_CREATE_EX) creates a new graph. It also provides the opportunity to specify the EPPF 304 to be used in the graph and the type of security that the graph will use, as well as other aspects of the graph. This API returns a graph handle that is allocated to the newly created graph.

A graph open method (PEER_GRAPH_OPEN_EX) opens a graph that has been previously created.

An endpoint provider data structure (PEER_ENDPOINT_PROVIDER) provides a list of function pointers that the graphing functionality 604 can call into any time a network operation is requested of it This data structure can be provided in the above-mentioned graph creation and open methods. The data structure specifies the following methods, described in further detail below: INIT_FUNC; SHUTDOWN_FUNC; LISTEN_FUNC; STOP_LISTENING_FUNC; GET_LISTEN_INFO_FUNC; CREATE_CONNECTION_FUNC; CLOSE_CONNECTION_FUNC; SEND_MESSAGE_FUNC; and GET_CONNECTION_INFO_FUNC.

The initialization method (INIT_FUNC) is called by the graphing functionality 604 when a graph is created or opened. In response to this initialization method, the EPPF 304 is expected to perform any necessary initialization and store callback function pointers for later use. This initialization method references the following exemplary callbacks:

OnIncomingConnection: The EPPF 304 calls this callback when a new connection is accepted.

OnConnectionChange: The EPPF 304 calls this callback when the status of a connection is changed.

OnMessageSent: The EPPF 304 calls this callback after a message is sent.

OnMessageReceived: The EPPF 304 calls this callback when a message is received.

OnAddressChange: The EPPF 304 calls this callback if it detects that underlying address information has changed.

The shutdown method (SHUTDOWN_FUNC) is called by the graphing functionality 304 to inform the EPPF 304 to perform any necessary cleanup operations following the shutdown of a connection.

The listen method (LISTEN_FUNC) informs the EPPF 304 that it should begin listening for incoming connection on a specified scope.

The stop listening method (STOP_LISTENING_FUNC) informs the EPPF 304 to stop accepting new incoming connections.

The get listen info method (GET_LISTEN_INFO_FUNC) informs the EPPF 304 to return an array of addresses for which it is listening on a specified port.

The create connection method (CREATE_CONNECTION_FUNC) informs the endpoint provider 304 to create a new connection to a node specified in an address parameter ("pAddr").

The close connection method (CLOSE_CONNECTION_FUNC) closes a connection with a specified connection ID.

The message send method (SEND_MESSAGE_FUNC) instructs the EPPF 304 to send a message on a specified connection ID.

The get connection info method (GET_CONNECTION_INFO_FUNC) instructs the EPPF 304 to retrieve information regarding a specified connection ID.

Figure 9:
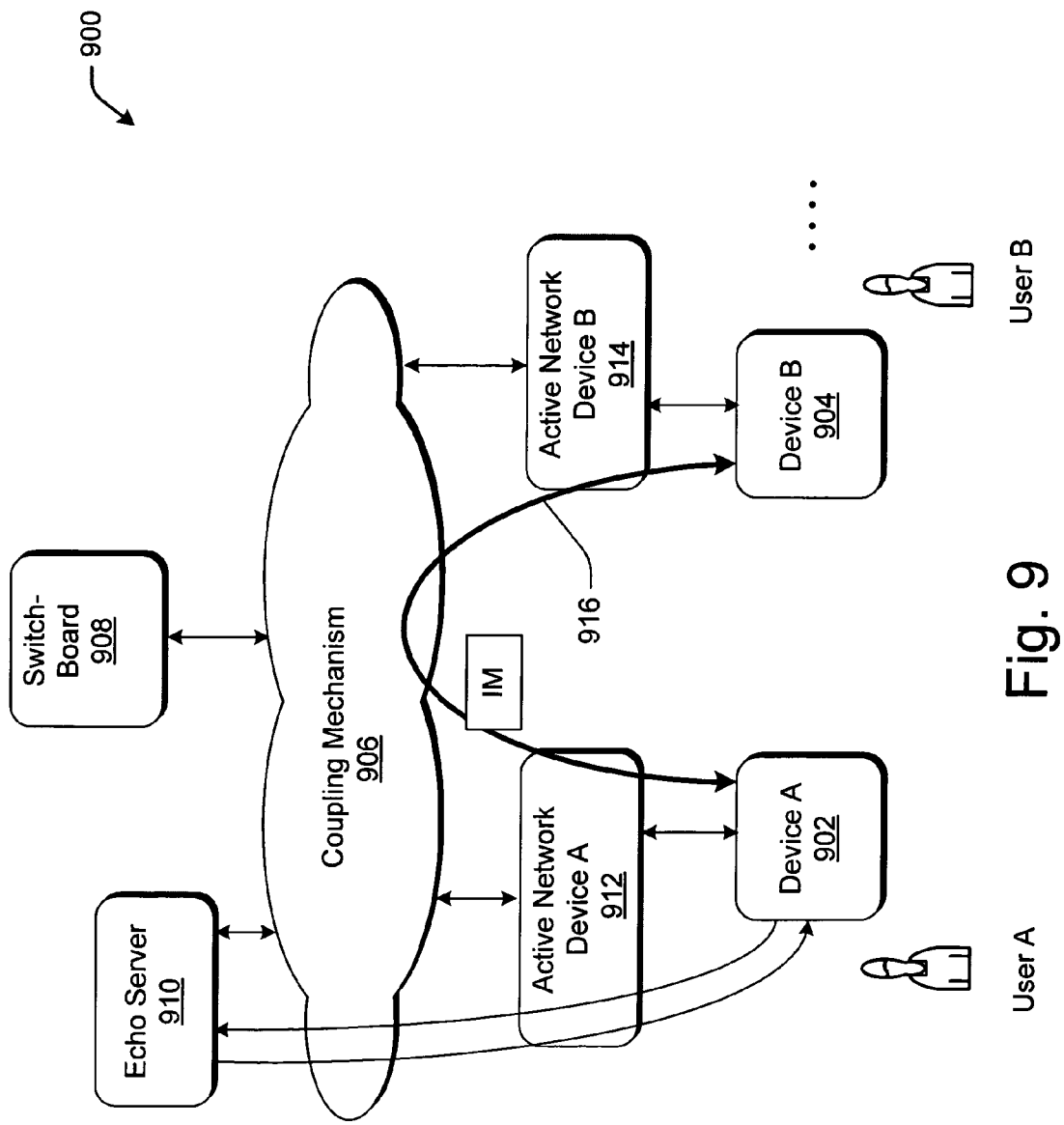
FIG. 9 shows a system which illustrates the operation of a transport mechanism used in the endpoint functionality of FIG. 8.
Figure 10:
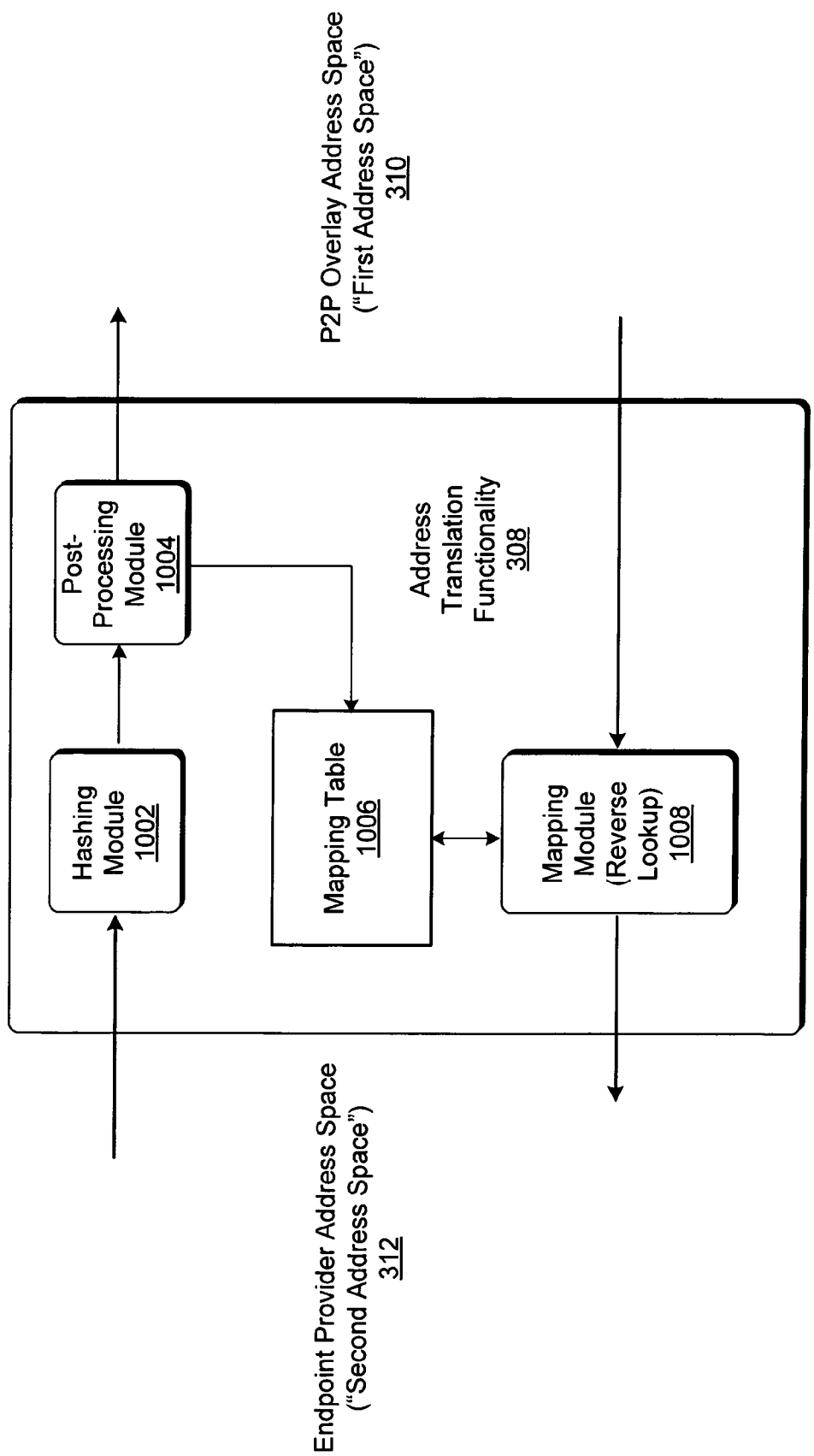
FIG. 10 shows an exemplary address translator (ATF) for use in translating address information between the PPOF and the EPPF of FIG. 3.

A.4. Exemplary Messenger-Related Functionality and Associated Endpoint Provider Functionality (FIGS. 8-10)

A.4.1. Overview

Figure 8:
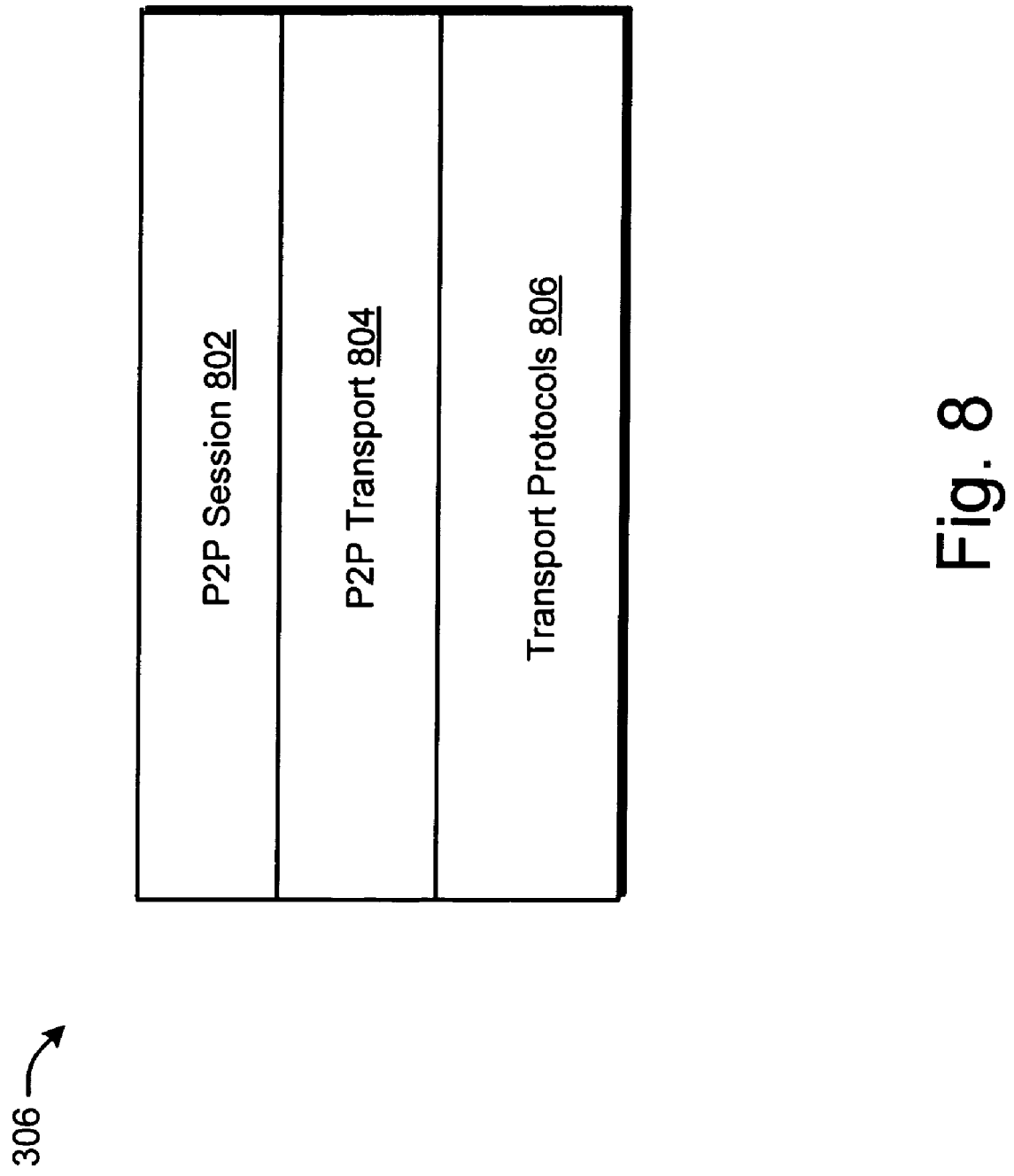
FIG. 8 shows an exemplary transport mechanism used by endpoint provider functionality (EPPF) of FIG. 3.

FIG. 8 provides additional details regarding the transport mechanism 306 introduced in the context of FIG. 3. The transport mechanism 306 is a component of the EPPF 304.

As shown in FIG. 8, the transport mechanism 306 can be implemented as a protocol stack of various P2P-related protocol layers (802-806). A P2P session layer 802 defines a main object of transport API. All higher level features interact with the P2P session layer 802. More specifically, this layer 802 encapsulates the concept of the conversation between participants and exposes methods to send and receive data among participants. The P2P transport layer 804 handles the actual transmission of the P2P session traffic from one participant device to another participant device via particular transport protocols. Among other duties, the P2P transport layer 804 can perform the score-based selection of transport protocols in a manner described below. The transport protocols layer 806 pertains to the actual transport protocols that a participant device can employ to form a P2P connection with another participant device.

The various P2P layers (e.g., 802, 804, 806) together form a transport strategy, described in further detail below.

In a messenger-related context, a feature-related protocol layer (not shown) is logically provided "above" the protocol stack (802, 804, 806). The feature-related layer is responsible for handling different facets of the IM service. For instance, the IM service can allow a participant to communicate in different ways with another participant, such as by exchanging textual IM messages with another participant, exchanging files with another participant, exchanging images with another participant, and so forth. Each one of these separate facets is regarded as a feature herein.

More specifically, according to one exemplary and non-limiting implementation, the creation of a conversation panel will prompt the messenger-related functionality to create a master communication session. Within that master communication session, the participant can invoke different feature sessions. For example, when the participant wants to send another user a text file, the participant can invoke the file transfer feature, prompting the messenger-related functionality to establish a feature session to accomplish the file transfer. Upon receiving a feature-specific invitation from an initiating participant device, the target participant device will apply registration functionality to also invoke a corresponding feature session on its machine.

One particular feature in the feature layer comprises the PPOF 302. The PPOF 302 can be invoked when the participant enters a command to commence a multi-party communication session, or when the participant responds to an invitation to join such a session. The feature-related protocol layer can also include a number of other applications which activate other feature-related aspects of the messenger-related functionality.

FIG. 3 demonstrates the manner in which the ATF aspects of the EPPF 304 fit in with the above-described stack structure. For example, logically speaking, the part of the ATF functionality 308 which converts from the PPOF 302 space to the EPPF 304 space is positioned between the PPOF 302 and the transport mechanism 306.

A.4.2. Transport Strategy

The purpose of the transport strategy is to select a transport protocol for coupling together two participant devices in the P2P system 200. The transport strategy makes a similar analysis for each link in the P2P system 200. As indicated in FIGS. 2 and 4, different transport protocols may be appropriate for different respective links in the P2P system 200.

To achieve the above objective, the transport strategy can employ selection functionality (not shown) to weigh different criteria and to select the transport protocol that is best suited to implement a coupling between two participants. Exemplary criteria include: (a) the bandwidth associated with different transport protocols; (b) the size of the information to be sent over the link; (c) various costs associated with the transport protocols; (d) various privacy consequences of the use of different transport protocols; (e) various user preferences with respect to the transport protocols; (f) whether there are any intermediary network devices (e.g., network address translators, firewalls, etc.) that have a bearing on the suitability of the transport protocols; (g) whether a particular transport protocol has failed between the participants on a prior occasion, and so forth. Selection can be performed by computing a single score for each transport protocol based on how well it satisfies the multiple criteria, and then choosing the transport protocol with the best score (e.g., the lowest or highest score).

The transport strategy can implement the above selection of an optimal transport protocol by exchanging various control messages between the two participants. In one message exchange protocol, a first participant device can inform a second participant device of the types of transport protocols that it can possibly use to communicate with the second participant device. The second participant device can then respond by selecting one transport protocol from the permitted list using the selection approach described above. The participant devices can then exchange whatever connectivity information is necessary to set up whatever transport protocol has been selected. This preliminary exchange of information can be carried out by a reliable channel available to all participants, although this channel might not be ultimately optimal for all connections.

After such exchange, the participant devices can then be used to carry out the exchange of information using the selected protocol. Upon failure of the selected transport protocol, the selection functionality described above can be again employed to select another transport protocol, this time omitting the failed transport protocol from the list of permissible transport protocols.

In one exemplary case, the Transport Level Protocol (TLP) can be used to facilitate the exchange of information. Namely, a TLP packet has a TLP header that includes various control information that can be used to exchange control messages between participant devices. For instance, control messages can be used to verify that the selected coupling path is working properly. That is, one device can send a request acknowledgement (RAK) message to another device, whereupon the other device can reply with an acknowledgement (ACK) message; this provides some assurance that the channel is working properly. RAK/ACK messages can be sent when a coupling path is first established and thereafter at periodic intervals to make sure it is still working properly. Other information in the control message can be used to convey whether a user device permits direct coupling.

FIG. 9 shows a system 900 that illustrates how the transport strategy can investigate the connectivity characteristics of two participant devices, namely, participant device A 902 and participant device B 904. These devices (902, 904) are coupled together via a coupling mechanism 906. The system 900 further includes an optional switchboard 908.

In addition, the system 900 includes an echo server 910. The purpose of the echo server 910 is to allow any of the participant devices (902, 904) to discover network functionality (912, 914) that needs to be taken into account when setting up a link 916 between the two devices (902, 904).

More specifically, the network devices (912, 914) can represent any kind of active network devices, such as firewalls, network address translators (NATs), and so forth. The network devices (912, 914) generally provide system security for their respective client devices. Thus, the network device A 912 can provide security for the participant device A 902, and network device B 914 can provide security for the participant device B 904. (More generally, various network configurations are possible. In one network configuration, the network device A 912 is present, but the network device B 914 is not present. In another network configuration, the network device B 914 is present, but the network device A 912 is not present. In another network configuration, neither network devices (912, 914) are present. In a fourth network configuration, both network devices (912, 914) are present.) When present, the network devices (912, 914) can have unique network addresses, such as internet protocol (IP) addresses, whereby the network devices (912, 914) receive data bound for their respective participant devices (902, 904). Network devices (912, 914) can then forward the data to their respective participant devices (912, 914) by providing various security screening functions and/or address translation functions, and so forth.

As mentioned, the role of the echo server 910 is to provide information to the participant devices (902, 904) regarding the nature of the network devices (912, 914) that should be taken into account when selecting and establishing the coupling link 916. For example, the participant device A 902 can use the echo server 910 to obtain the network address associated with the network device A 912. To achieve this result, the participant device A 902 can send the echo server 910 a message. When the echo server 910 receives the message from the participant device A 902, the message will include the network address of the network device A 912. In response, the echo server 910 sends the network address of the network device A 912 back to the participant device A 902. The participant device B 904 may obtain the network address of the network device B 914 through a similar protocol by sending a query message to the echo server 910.

Armed with information regarding the network devices (912, 914), the participant devices (902, 904) can make more intelligent decisions regarding the transport protocol that should be used to establish the coupling link 916. In other words, knowledge of the network devices (912, 914) has a bearing on the ranking of the transport protocols described above, because one such factor in the computed suitability score pertains to whether any network devices (912, 914) are present, and if so, what these devices (912, 914) might be. Also, the knowledge gained by the echo server 910 provides address information that is used to establish the coupling link 916.

A.4.3. Address Translator Functionality (ATF)

FIG. 10 provides additional information regarding the address translation functionality (ATF) 308 introduced in the context of FIG. 3. Recall that the purpose of the ATF 308 is to translate between a PPOF address space 310 used by the PPOF 302 and an EPPF address space 312 used by the EPPF 304. There are many possible implementations of the PPOF and EPPF address spaces (310, 312). According to one exemplary implementation, the PPOF address space 310 identifies address information using IPv6-compatible addresses and the EPPF address space 312 identifies address information using user name addresses (such as Email addresses). In general, address information provides information that can be used to identify and locate a participant device (202-212) in the P2P system 200. Recall that the address information expressed in different address spaces ultimately targets the same participant, but using a different format for expressing the address information.

In the above-identified exemplary implementation, the ATF 308 can include a hashing module 1002 for hashing address information expressed in the EPPF address space 312 (corresponding to, for example, user name address information). Any hashing algorithm can be used to implement the hashing module 1002, such as the known SHA1 algorithm. The SHA1 algorithm produces a 20-byte hash result.

A post-processing module 1004 receives the hash result and performs various optional transformations on the hash result. For example, the post-processing module 1004 can modify the number of bits in the hash result, such as by removing bits from the hash result so that it conforms to the expectations of the PPOF address space 310. For example, IPv6 addresses are 16 bytes, so the post-processing module 1004 can remove 4 bytes of the hash result to yield a 16-byte address. Depending on the hash module being used, the post-processing module 1004 could also possibly add bits to provide a proper address in the PPOF address space 310, or perform some other transformation of the hash result.

Further, the post-processing module 1004 can optionally pre-pend a special prefix to the hash result (or modify it in other ways) to ensure that the address information that it identifies does not correspond to a valid address in some other unintended address space. For example, one possibility is that a node in the graph receives a hashed IPv6-like address from the ATF 308 of the EPPF 304, but then inappropriately accesses another EPPF to form the actual connection. If that other EPPF uses IPv6, then there might be some risk, albeit remote, that the IPv6-like address created through hashing identifies a pre-existing entity in the "real" IPv6 space. Pre-pending a special reserved prefix to the hash result will remedy this problem. An entity which receives such an IPv6 address will interpret the prefix as indicating that the address really corresponds to an entity in the messenger-related address space (for example). The output of the post-processing module 1004 yields address information in the PPOF address space 310.

The ATF 308 also includes a mapping table 1006. The mapping table 1006 stores address information processed by the hashing module 1002. More specifically, for the above-described scenario, the mapping table 1006 can store the original address information in the EPPF address space 312 (e.g., the user name address information) as well as the transformed address information in the PPOF address space 310. More specifically, the mapping table 1006 stores this pair of address information such that its original form and translated form are associated with each other, such that one can be retrieved based on the other.

The mapping table 1006 can be populated when a participant first logs into the IM service. That is, when a participant PPOF logs onto the IM service, the ATF 308 retrieves all of the contacts in the participant's contact list. These contacts identify people with whom the participant communicates using the IM service. The ATF 308 hashes all the user names in the contact list to IPv6-compatible address information, and then stores the results (in correspondence with the original user names) in the mapping table 1006.

The ATF 308 also includes a mapping module 1008. The purpose of the mapping module 1008 is to use the mapping table 1006 to convert address information in the PPOF address space 310 to address information in the EPPF address space 312. It performs this operation by using the address information in the PPOF address space 310 (e.g., the IPv6 address information) as a key to lookup the corresponding address information in the mapping table 1006 expressed in the EPPF address space 312 (e.g., the user name address information).

In use, the messenger-related functionality 502 can communicate address information to the PPOF 302 by tasking the ATF 308 to hash the user name address information to produce IPv6-like address information, and forwarding the transformed IPv6-like address information to the PPOF 302. The PPOF 302 can communicate address information to the EPPF 304 by tasking the ATF 308 to convert the IPv6-like address information its corresponding user name counterpart (determined by consulting the mapping table 1006).

As a final note, the ATF 308 was described in the specific context of the communication functionality 300 within an IM service. However, the ATF 308 can be used in any environment where it is appropriate to translate between the address space used by one system and the address space used by another system.

A.4.4. Endpoint Provider Interface Functionality

The EPPF 304 includes a complementary set of methods designed to interact with the APIs provided by the PPOF 302 (described in section A.3.2 above).

An initialization function (Init) is called when a new graph is created. It stores the set of callback functions that PPOF 302 passes to the EPPF 304 for various events defined above. Every time the Init function is called, a counter ("init count") is incremented.

A shutdown function (Shutdown) is called when a graph is closed. It decrements the counter from the Init call. If this counter decrements to zero, all connections are closed, and the EPPF 304 goes back to its un-initialized state.

A listen function (Listen) initiates a listening mode in which the EPPF 304 listens for incoming connections.

A stop listening function (StopListening) terminates the listening mode.

A get listen info function (GetListenInfo) returns an array of addresses representing the addresses that the EPPF 304 is listening on, which are converted into IPv6 addresses by the ATF 308 (in one exemplary implementation).

A get connection info function (GetConnectioninfo) provides address information when called.

A creation connection function (CreateConnection) creates a connection. This function can create the connection by performing the following operations: (1) Validate that the address specified by the "pAddr" parameter matches the hash of one of the participants in the local participant's contact list; (2) Create an IM session with that participant (if not already established); (3) Create a slave P2P session on top of this session; (4) Create a local connection data structure that stores session interface pointers, addresses, and other information related to this connection; (5) Return back to the PPOF 302 a unique connection ID to reference this connection for subsequent API calls.

A close connection function (CloseConnection) shuts down and releases the session objects associated with the connection referenced by the connection ID.

A send message function (SendMessage) sends information over an established connection.

B. Exemplary Method of Operation (FIGS. 11 and 12)

Figure 11:
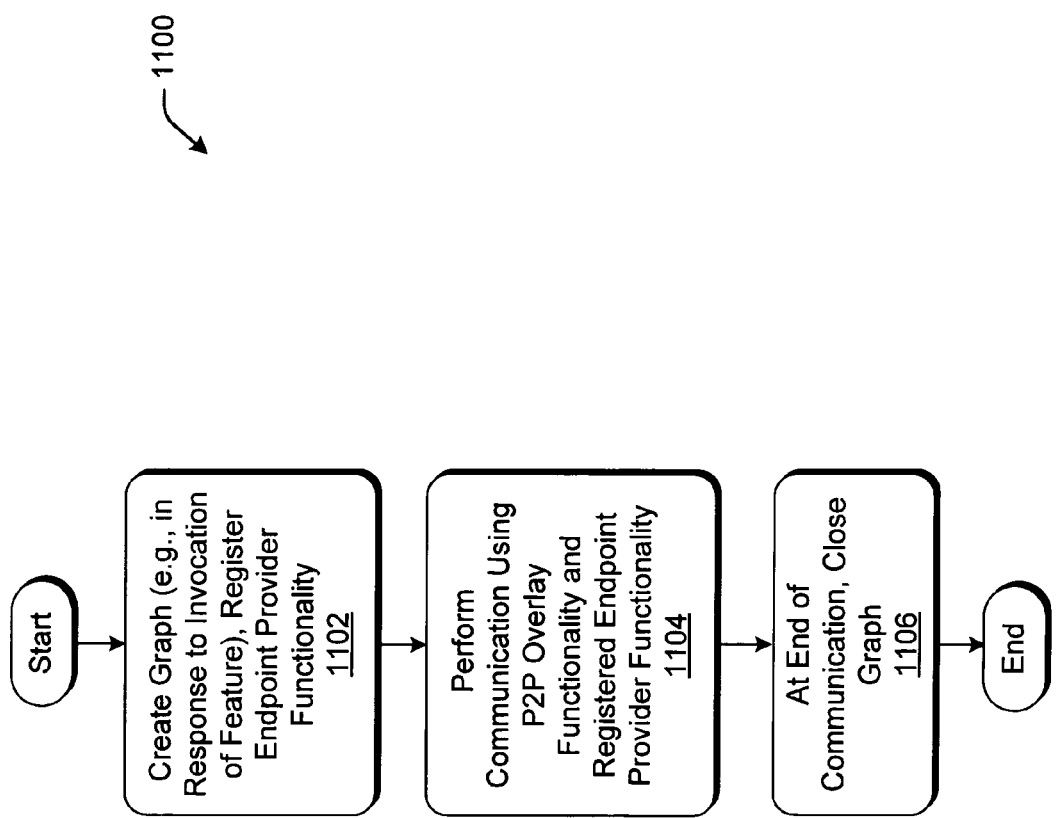
FIG. 11 shows an overview of the operation of the P2P system of FIG. 2.
Figure 12:
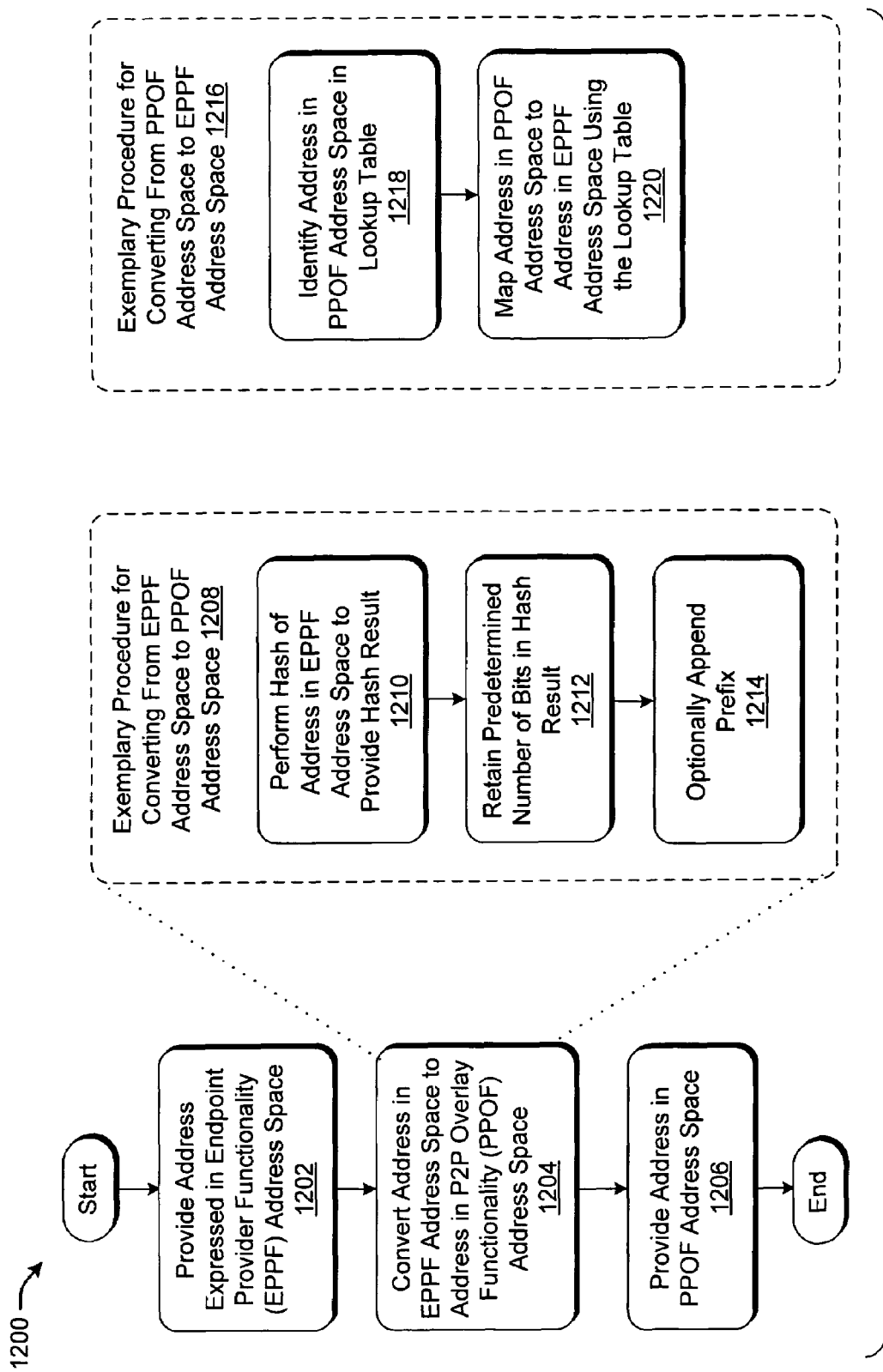
FIG. 12 shows a procedure which illustrates the operation of the address translator of FIG. 10.

FIGS. 11 and 12 together describe the operation of the systems of Section A in flow chart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure. As the functions described in these flowcharts have already been explained above, this section will serve primarily as a review of those functions.

B.1. Overview of Exemplary Operation (FIG. 11)

FIG. 11 shows a procedure 1100 that provides an overview of the operation of the communication functionality 300. In step 1102, a multi-party communication application activates the PPOF 302. This prompts the PPOF 302 to create a graph having nodes that represent the participants. The application (or other entity) can also register a selected EPPF 304 with the PPOF 302. This registration operation informs the PPOF 302 that the selected EPPF 304 is to be used to implement the physical exchange of information between participants (rather than a default transport protocol that may be provided by the PPOF 302).

In step 1004, the communication functionality 300 performs a communication session using both the PPOF 302 and the EPPF 304. That is, the PPOF 302 performs the logical management of the graph, while the EPPF 304 implements the physical coupling of links in the graph and the actual exchange of information among nodes in the graph. (More precisely, the transport mechanism 306 of the EPPF 304 performs the physical coupling.) The communication session may correspond to a multi-party IM chat session (having three or more participants).

In step 1106, the communication functionality 300 closes the graph at the end of the communication session. For example, a communication session ends when all of the participants leave the multi-party conversation.

B.2. Exemplary Operation of the Address Translation Functionality (ATF) (FIG. 12)

FIG. 12 shows a procedure 1200 that illustrates the operation of the ATF 308 described in FIGS. 3 and 10. Reference to "address spaces" pertains to the address spaces (308, 310) defined in the context of FIG. 3.

In step 1202, the communication functionality 300 provides address information expressed in the EPPF address space 312 (e.g., a name-compatible address space). In step 1204, the ATF 308 converts the address information expressed in the EPPF address space 312 to address information expressed in the PPOF address space 310 (e.g., an IPv6-compatible address space). In step 1206, the communication functionality 300 provides the thus-produced address information in the PPOF address space 310.

Subprocedure 1208 provides more details regarding the operation of the translation operation of step 1204. In step 1210, the ATF 308 performs a hash of the address information in the EPPF address space 312 to provide a hash result. In step 1212, the ATF 308 optionally retains a predetermined number of bits in the hash result (such as 16 bytes out of a 20 byte hash result produced by the SHA1 hash algorithm). (More generally, step 1212 can involve modifying the hash result in any appropriate way, not necessarily truncating it.) In step 1214, the ATF 308 optionally pre-pends a prefix code (or otherwise modifies the hash result) so that it does not yield address information which defines a valid address in some other unrelated and unintended address space.

Subprocedure 1216 provides details regarding a manner in which the ATF 308 can convert the address information from the PPOF address space 310 back to the EPPF address space 312. Namely, in step 1218, the communication functionality 300 identifies an address in the PPOF address space 310 to be translated into an address in the EPPF address space 312. In step 1220, the ATF 308 performs the translation by using the address information in the PPOF address space 310 as a key to identify corresponding address information in the EPPF address 312 space within the mapping table 1006.

C. Exemplary Computer Environment (FIG. 13)

In one exemplary implementation, certain aspects of the communication functionality 300 can be implemented as computer code executed by the participant devices (e.g., participant device A 402). In this case, FIG. 13 provides information regarding an exemplary computer environment 1300 that can be used to implement such message service functionality. Additionally, insofar as various head-end functionality is implemented by server-type computers, FIG. 13 also provides information regarding an exemplary implementation of any of such server computers.

The computing environment 1300 includes a general purpose or sever type computer 1302 and a display device 1304. However, the computing environment 1300 can-include other kinds of computing equipment. For example, although not shown, the computer environment 1300 can include hand-held or laptop devices, set top boxes, game consoles, etc. Further, FIG. 13 shows elements of the computer environment 1300 grouped together to facilitate discussion. However, the computing environment 1300 can employ a distributed processing configuration. In a distributed computing environment, computing resources can be physically dispersed throughout the environment.

Exemplary computer 1302 includes one or more processors or processing units 1306, a system memory 1308, and a bus 1310. The bus 1310 connects various system components together. For instance, the bus 1310 connects the processor 1306 to the system memory 1308. The bus 1310 can be implemented using any kind of bus structure or combination of bus structures, including a memory bus or memory controller, a peripheral bus, an accelerated graphics port, and a processor or local bus using any of a variety of bus architectures.

Computer 1302 can also include a variety of computer readable media, including a variety of types of volatile and non-volatile media, each of which can be removable or non-removable. For example, system memory 1308 includes computer readable media in the form of volatile memory, such as random access memory (RAM) 1312, and non-volatile memory, such as read only memory (ROM) 1314. ROM 1314 includes an input/output system (BIOS) 1316 that contains the basic routines that help to transfer information between elements within computer 1302, such as during start-up. RAM 1312 typically contains data and/or program modules in a form that can be quickly accessed by processing unit 1306.

Other kinds of computer storage media include a hard disk drive 1318 for reading from and writing to a non-removable, non-volatile magnetic media, a magnetic disk drive 1320 for reading from and writing to a removable, non-volatile magnetic disk 1322 (e.g., a "floppy disk"), and an optical disk drive 1324 for reading from and/or writing to a removable, non-volatile optical disk 1326 such as a CD-ROM, DVD-ROM, or other optical media. The hard disk drive 1318, magnetic disk drive 1320, and optical disk drive 1324 are each connected to the system bus 1310 by one or more data media interfaces 1328. Alternatively, the hard disk drive 1318, magnetic disk drive 1320, and optical disk drive 1324 can be connected to the system bus 1310 by a SCSI interface (not shown), or other coupling mechanism. Although not shown, the computer 1302 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1302. For instance, the readable media can store the operating system 1330, application-specific functionality 1332 (including functionality for implementing aspects of the communication functionality 300), other program modules 1334, and program data 1336.

The computer environment 1300 can include a variety of input devices. For instance, the computer environment 1300 includes the keyboard 1338 and a pointing device 1340 (e.g., a "mouse") for entering commands and information into computer 1302. The computer environment 1300 can include other input devices (not illustrated), such as a microphone, joystick, game pad, satellite dish, serial port, scanner, card reading devices, digital or video camera, etc. Input/output interfaces 1342 couple the input devices to the processing unit 1306. More generally, input devices can be coupled to the computer 1302 through any kind of interface and bus structures, such as a parallel port, serial port, game port, universal serial bus (USB) port, etc.

The computer environment 1300 also includes the display device 1304. A video adapter 1344 couples the display device 1304 to the bus 1310. In addition to the display device 1304, the computer environment 1300 can include other output peripheral devices, such as speakers (not shown), a printer (not shown), etc.

Computer 1302 operates in a networked environment using logical connections to one or more remote computers, such as a remote computing device 1346. The remote computing device 1346 can comprise any kind of computer equipment, including a general purpose personal computer, portable computer, a server, etc. Remote computing device 1346 can include all of the features discussed above with respect to computer 1302, or some subset thereof.

Any type of network 1348 can be used to couple the computer 1302 with remote computing device 1346, such as the WAN 402 of FIG. 4, a LAN, etc. The computer 1302 couples to the network 1348 via network interface 1350 (e.g., the interface 416 shown in FIG. 4), which can utilize broadband connectivity, modem connectivity, DSL connectivity, or other connection strategy. Although not illustrated, the computing environment 1300 can provide wireless communication functionality for connecting computer 1302 with remote computing device 1346 (e.g., via modulated radio signals, modulated infrared signals, etc.).

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for communicating among a plurality of participants, comprising:
    providing a peer-to-peer overlay functionality for establishing a peer-to-peer overlay network that includes a plurality of participants, the peer-to-peer overlay network including a native transport protocol and a graph that logically couples the plurality of participants together;
    providing an endpoint provider functionality for establishing a transport strategy used to exchange information among the plurality of participants in the peer-to-peer overlay network, the transport strategy selecting at least one replacement transport protocol to replace the native transport protocol; and
    conducting a communication session among the plurality of participants using the graph of the peer-to-peer overlay functionality and the at least one replacement transport protocol selected by the transport strategy,
    wherein the transport strategy accommodates multiple different transport protocols for exchanging information among the plurality of participants, and
    wherein the establishing a transport strategy includes:
        determining a plurality of transport protocols that are usable to each pair-wise combination of participants;
        computing, for each pair-wise combination of participants, a score for each of the plurality of transport protocols based on one or more criterions; and
        selecting, for each pair-wise combination of participants, a replacement transport protocol from the plurality of transports protocols based on the scores,
    wherein the one or more criterions includes at least one of bandwidth associated with different transport protocols, size of the information to be sent over the link, one or more costs associated with the transport protocols, one or more privacy consequences of using different transport protocols, presence of one or more intermediary devices between the each pair-wise combination of participants, and one or more prior failures of the plurality of transport protocols.

2. Then method of claim 1, wherein the peer-to-peer overlay functionality provides multicasting functionality for disseminating information among the plurality of participants.

3. The method of claim 1, wherein a first participant of at least one pair-wise combination of participants is separated from a second participant by the one or more intermediary devices.

4. The method of claim 1, wherein the providing of the endpoint provider functionality comprises associating the endpoint provider functionality with the peer-to-peer overlay functionality as an agent that will be used to exchange information among the plurality of participants.

5. The method of claim 3, wherein the intermediary devices include at least one of a firewall or a network address translator (NAT).

6. The method of claim 1, wherein at least one of the transport protocols comprises a direct coupling path between two participants.

7. The method of claim 1, wherein at least one of the transport protocols comprises an indirect coupling path between two participants that involves routing of information through a server entity.

8. The method of claim 1, wherein the peer-to-peer overlay functionality uses a first address space to identify the plurality of participants and the endpoint provider functionality uses a second address space to identify the plurality of participants.

9. The method of claim 8, wherein the conducting of the communication translates address information from the first address space to the second address space, and from the second address space to the first address space.

10. The method of claim 9, wherein the translating of address information from the second address space to the first address space comprises hashing address information expressed in the second address space to provide a hash result, and modifying the number of bits in the hash result to provide address information expressed in the first address space.

11. The method of claim 10, wherein the translating of address information from the first address space to the second address space comprises mapping the address information in the first address space back to the address information in the second address space.

12. The method of claim 9, further comprising modifying translated address information so that it does not inadvertently identify address information in an unintended address space.

13. One or more computer-readable media containing machine readable instruction capable of being executed by a computer for implement the method of claim 1.

14. A communication system for communicating among a plurality of participants, comprising:
    a peer-to-peer overlay component configured to establish a peer-to-peer overlay network that includes a plurality of participants, the peer-to-peer overlay component defining a native transport protocol and a graph that logically couples the plurality of participants together; and an endpoint provider component configured to establish a transport strategy used to exchange information among the plurality of participants in the peer-to-peer overlay network, the endpoint provider component including a transport mechanism to select at least one replacement transport protocol to replace the native transport protocol, wherein the transport strategy enables communication between each pair of participants by exchanging information using one replacement transport protocol on the graph defined by the peer-to-peer overlay network wherein the peer-to-peer overlay component is configured to use a first address space to identify the plurality of participants and the endpoint provider component is configured to use a second address space to identify the plurality of participants.

15. The communication system of claim 14, wherein the peer-to-peer overlay component is configured to provide multicasting functionality for disseminating information among the plurality of participants.

16. The communication system of claim 14, wherein the endpoint provider component includes:
a first functionality to determine a plurality of transport protocols that are usable to each pair-wise combination of participants;
a second functionality to compute, for each pair-wise combination of participants, a score for each of the plurality of transport protocols based on one or more criterions; and
a third functionality to select, for each pair-wise combination of participants, a replacement transport protocol from the plurality of transports protocols based on the scores.

17. The communication system of claim 14, wherein the endpoint provider component further comprises an address translation component configured to translate address information from the first address space to the second address space, and from the second address space to the first address space.

18. A method for communicating among a plurality of participants, comprising:
providing a peer-to-peer overlay functionality for establishing a peer-to-peer overlay network that includes a plurality of participants, the peer-to-peer overlay network including a native transport protocol and a graph that logically couples the plurality of participants together;
providing an endpoint provider functionality for establishing a transport strategy used to exchange information among the plurality of participants in the peer-to-peer overlay network, the transport strategy selecting at least one replacement transport protocol to replace the native transport protocol; and
conducting a communication session among the plurality of participants using the graph of the peer-to-peer overlay functionality and the at least one replacement transport protocol selected by the transport strategy,
wherein the providing of the endpoint provider functionality comprises associating the endpoint provider functionality with the peer-to-peer overlay functionality as an agent that will be used to exchange information among the plurality of participants.

19. The method of claim 18, further comprising mapping user name address information in the first address space to IPv6 address information in the second address space.

* * * * *